United States Patent
Fujitsuka et al.

(10) Patent No.: US 10,503,281 B2
(45) Date of Patent: Dec. 10, 2019

(54) POSITION INDICATOR

(71) Applicant: Wacom Co., Ltd., Saitama (JP)

(72) Inventors: Hiroyuki Fujitsuka, Saitama (JP); Takenori Kaneda, Tochigi (JP); Takayuki Arai, Saitama (JP); Kenichi Ninomiya, Kanagawa (JP); Kohei Tanaka, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 176 days.

(21) Appl. No.: 15/840,855

(22) Filed: Dec. 13, 2017

(65) Prior Publication Data

US 2018/0101251 A1 Apr. 12, 2018

Related U.S. Application Data

(63) Continuation of application No. PCT/JP2016/069831, filed on Jul. 5, 2016.

(30) Foreign Application Priority Data

Jul. 10, 2015 (JP) ................................. 2015-138316

(51) Int. Cl.
*G06F 3/033* (2013.01)
*G06F 3/0354* (2013.01)
*G06F 3/046* (2006.01)
*G01L 1/14* (2006.01)
*G06F 3/038* (2013.01)

(52) U.S. Cl.
CPC ............ *G06F 3/03545* (2013.01); *G01L 1/14* (2013.01); *G01L 1/148* (2013.01); *G06F 3/0383* (2013.01); *G06F 3/046* (2013.01)

(58) Field of Classification Search
CPC .................................................. G06F 3/03545
See application file for complete search history.

(56) References Cited

U.S. PATENT DOCUMENTS 5,206,785 A 4/1993 Hukashima
9,377,880 B2 6/2016 Fukushima et al.
(Continued)

FOREIGN PATENT DOCUMENTS

JP 4-96212 A 3/1992
JP 2013-161307 A 8/1993
(Continued)

*Primary Examiner* — Roy P Rabindranath
(74) *Attorney, Agent, or Firm* — Seed IP Law Group LLP

(57) ABSTRACT

A pen pressure detection device includes: a pressure sensor including electrodes that output electrical information corresponding to an applied pressure; and a holder configured to electrically connect the pressure sensor to a circuit board having a circuit that detects the applied pressure based on the electrical information output from the pressure sensor. The holder includes a first portion that retains the pressure sensor and a second portion that engages with the circuit board, and the holder has a surface on which wiring is formed, the wiring extending from the first portion to the second portion, and the electrodes of the pressure sensor being electrically connected to the circuit board via the wiring when the holder and the circuit board are engaged with each other. The pen pressure detection device can be easily assembled and maintain a connection to the circuit board when the applied pressure is high.

30 Claims, 10 Drawing Sheets

(56) References Cited

U.S. PATENT DOCUMENTS

| | | | |
|---|---|---|---|
| 9,778,123 B2 | 10/2017 | Horie et al. | |
| 2014/0306940 A1* | 10/2014 | Fukushima | G06F 1/1626 345/179 |
| 2016/0018912 A1* | 1/2016 | Kaneda | G06F 3/033 345/179 |
| 2016/0162049 A1* | 6/2016 | Horie | G06F 3/03 345/179 |

FOREIGN PATENT DOCUMENTS

| | | | |
|---|---|---|---|
| JP | 2014-127009 A | 7/2014 |
| JP | 2014-206775 A | 10/2014 |

* cited by examiner

POSITION INDICATOR

BACKGROUND

Technical Field

The present disclosure relates to an electronic pen that is used in conjunction with a position detection device and which has a pen pressure detecting function. More particularly, the present disclosure relates to a pen pressure detection device used in an electronic pen.

Background Art

An electronic pen includes: a core body that transmits a pen pressure (pressure) applied to a pen tip; a pen pressure detection device that includes a pressure sensor for detecting the pen pressure (pressure); and a pen pressure detecting circuit for obtaining an electric output signal corresponding to the pen pressure detected by the pressure sensor.

Generally, the pressure sensor captures the pen pressure (pressure) applied to the pen tip as a change in an electrical characteristic quantity (electrical information) such as a capacitance or an inductance, for example. Therefore, the pressure sensor has two electrodes, and the pen pressure detection device has two terminals electrically connected to the two electrodes of the pressure sensor.

The pen pressure detecting circuit is disposed on a printed circuit board. The two terminals of the pen pressure detection device are electrically connected to the printed circuit board by being for example soldered to the printed circuit board. The pen pressure detection device is thus connected to the pen pressure detecting circuit. Thereby, the pen pressure detecting circuit can detect an amount of change in the electrical characteristic quantity corresponding to the pen pressure detected by the pressure sensor of the pen pressure detection device, and obtain the electric output signal.

The pen pressure applied to the pen tip of the electronic pen can be a very high pressure. For example, an instantaneous force of 500 g or more can be applied to the pen tip constantly or intermittently. Therefore, in the pen pressure detection device, it is important to satisfy conditions as follows, for example:
the periphery of the pressure sensor needs to have durability against the strong force of the pen pressure;
high-precision parts are required as parts constituting the periphery of the pressure sensor; and
an electric connection to the pressure sensor needs to be secured under a high pressure.

Further, when parts constituting the pen pressure detection device have a displacement or unsteadiness, the following problems occur:
damage occurs in the pen pressure detection device;
an accurate pen pressure value cannot be detected; and
the electric connection between the pen pressure detection device and the pen pressure detecting circuit is broken.

Description will be made by citing a concrete example. Conventionally, as an electronic pen of this type, an electronic pen for a position detection device of an electromagnetic induction type is well known. This electromagnetic induction type electronic pen has a resonance circuit formed by connecting a capacitor for resonance to a coil wound around a ferrite core. The electronic pen indicates a position on a position detecting sensor of the position detection device by transmitting a resonance signal obtained by the resonance circuit to the position detection device.

The electromagnetic induction type electronic pen is configured to transmit a pressure applied to a tip end portion (pen tip) of a core body as a change in the resonance frequency of the resonance circuit to the position detection device. In this case, a method is known in which a pen pressure detection device detecting the pen pressure uses a pressure sensor that changes the inductance of a coil constituting the resonance circuit according to the pen pressure, or a method is known in which the pen pressure detection device detecting the pen pressure uses a pressure sensor that changes the capacitance of a capacitor constituting the resonance circuit according to the pen pressure.

FIG. 12 depicts a conventional constitution example of a pen pressure detection device including a pressure sensor of a variable capacitance capacitor type that changes the capacitance of a capacitor constituting a resonance circuit of an electronic pen according to a pen pressure. The conventional constitution example is described in Patent Document 1 (Japanese Patent Laid-Open No. 1992-96212).

FIG. 12 is a sectional view of assistance in explaining the constitution example of the pen pressure detection device in the present example. In addition, FIGS. 13A and 13B are diagrams of assistance in explaining some of parts of the pen pressure detection device in the example of FIG. 12.

A pen pressure detection device 100 in the example of FIG. 12 uses, as a pressure sensor 110, a variable capacitance capacitor that changes capacitance thereof so as to correspond to a pressure (pen pressure) applied to a core body 101 of the electronic pen. As depicted in FIG. 12, the pen pressure detection device 100 in the present example includes, within a holder 102 formed of resin, for example, the pressure sensor 110 and a pressure transmitting member 103 that transmits the pressure (pen pressure) applied to the core body 101 to the pressure sensor 110.

The holder 102 is formed by fitting a first holder 102a and a second holder 102b to each other. The pressure sensor 110 is formed as a variable capacitance capacitor by a first electrode conductor 111, a dielectric 112, a spacer 113, a second electrode conductor 114, and an elastic member 115.

As depicted in FIG. 13A, the dielectric 112 forms for example substantially a disk shape, and has one circular surface 112a and another circular surface 112b that face each other. The first electrode conductor 111 is formed on the one surface 112a of the dielectric 112.

The spacer 113 is formed of an insulative material. As depicted in FIG. 13B, the spacer 113 has a shape such that one projecting portion 113b is formed so as to project outwardly in a radial direction from a peripheral edge at an outside diameter of a thin plate body 113a having a ring shape whose outside diameter is equal to the diameter of the dielectric 112.

The second electrode conductor 114 is formed of a conductive material. As depicted in FIG. 13C, the second electrode conductor 114 has a shape such that one projecting portion 114b is formed so as to project outwardly in a radial direction from a peripheral edge of a thin plate body 114a having a disk shape whose outside diameter is equal to the diameter of the dielectric 112.

The elastic member 115 is formed of a material having elasticity such as a rubber, for example. As depicted in FIG. 13D, the elastic member 115 has a shape such that two projecting portions 115b and 115c are formed from peripheral edges of a thin plate body 115a having a disk shape whose outside diameter is equal to the diameter of the dielectric 112, the peripheral edges being separated from each other at an angular interval of 180 degrees.

As depicted in FIG. 12, the dielectric 112 is housed within the first holder 102a. A first terminal 104 led out to the outside from the first holder 102a is electrically connected to the first electrode conductor 111 formed on the one surface 112a of the dielectric 112. The first terminal 104 is formed of a conductive material, for example a conductive metal. As depicted in FIG. 13E, the first terminal 104 includes a disk-shaped contact piece 104a electrically connected to the first electrode conductor 111 by coming into contact with the first electrode conductor 111 and a rod-shaped portion 104b implanted vertically at a central position of the disk-shaped contact piece 104a. As depicted in FIG. 12, the rod-shaped portion 104b is led out to the outside from the first holder 102a.

As depicted in FIG. 12, the second electrode conductor 114 is disposed so as to face the other surface 112b side of the dielectric 112 with the spacer 113 interposed therebetween. The elastic member 115 is disposed so as to be superposed on an opposite side from the spacer 113 side of the second electrode conductor 114. In this case, the projecting portion 113b of the spacer 113 is disposed in a position spatially superposed on the projecting portion 115b of the elastic member 115, and the projecting portion 114b of the second electrode conductor 114 is disposed in a position superposed on the projecting portion 115c of the elastic member 115.

Then, a second terminal 105 led out to the outside from the first holder 102a is electrically connected to the projecting portion 114b of the second electrode conductor 114. The second terminal 105 is formed of a conductive material, for example a conductive metal. As depicted in FIG. 13F, the second terminal 105 includes a small-disk-shaped contact piece 105a electrically connected to the projecting portion 114b of the second electrode conductor 114 by coming into contact with the projecting portion 114b of the second electrode conductor 114 and a rod-shaped portion 105b implanted vertically at a central position of the small-disk-shaped contact piece 105a. As depicted in FIG. 12, the rod-shaped portion 105b is led out to the outside from the first holder 102a.

In the second holder 102b, the pressure transmitting member 103 is disposed in a state of being able to press the plate body 115a of the elastic member 115 in an axial direction and in a state of being movable in the axial direction of the second holder 102b. The pressure transmitting member 103 is formed in the shape of a shell, for example. A side of the pressure transmitting member 103 which side presses the plate body 115a of the elastic member 115 is a curved end surface 103a. In addition, as depicted in FIG. 12, the pressure transmitting member 103 has a fitting recessed portion 103b into which an end portion on an opposite side from a pen tip side of the core body 101 is fitted.

Then, the rod-shaped portion 104b of the first terminal 104 and the rod-shaped portion 105b of the second terminal 105 of the pen pressure detection device 100 configured as described above are soldered to conductor patterns on a printed circuit board. The pen pressure detection device 100 is thus electrically connected to a pen pressure detecting circuit disposed on the printed circuit board. Then, the core body 101 is fitted into the fitting recessed portion 103b of the pressure transmitting member 103 of the pen pressure detection device 100. The pen pressure detecting circuit therefore detects a pen pressure applied to the tip of the core body 101.

In the pen pressure detection device 100, as depicted in FIG. 12, in a state (initial state) in which no pressure (pen pressure) is applied to the pen tip side of the core body 101, the second electrode conductor 114 is physically separated from the second surface portion 112b of the dielectric 112 by the spacer 113, and is thus not in contact with the second surface portion 112b.

When a pressure is then applied to the pen tip side of the core body 101, the pressure is transmitted to the elastic member 115 via the pressure transmitting member 103, and the curved end surface 103a of the pressure transmitting member 103 presses and displaces the elastic member 115 to the dielectric 112 side. The thickness of an air layer between the second electrode conductor 114 and the second surface portion 112b of the dielectric 112 becomes smaller than in the initial state according to the pressing displacement of the elastic member 115. When the pressure applied to the pen tip side of the core body 101 is further increased, the pressing of the curved end surface 103a of the pressure transmitting member 103 brings the second electrode conductor 114 into contact with the second surface portion 112b of the dielectric 112. The area of the contact corresponds to the pressure applied to the core body 101.

Because the state between the first electrode conductor 111 and the second electrode conductor 114 changes as described above according to a pressing force applied to the core body 101, the capacitance of the variable capacitance capacitor of the pressure sensor 110 of the pen pressure detection device 100 changes according to the pressing force applied to the core body 101. The pen pressure detecting circuit disposed on the printed circuit board detects the pen pressure applied to the core body 101 on the basis of the capacitance of the variable capacitance capacitor.

PRIOR ART DOCUMENT

Patent Document

Patent Document 1: Japanese Patent Laid-Open No. 1992-96212

BRIEF SUMMARY

Technical Problems

Now, the pen pressure detection device is a part that receives a large force (pen pressure). Thus, depending on a manner of attachment of the pen pressure detection device to the printed circuit board and accuracy of an attachment position of the pen pressure detection device, a large stress may be applied to the parts of the two terminals of the pen pressure detection device, and a contact failure may occur.

However, the first and second terminals 104 and 105 led out from the conventional pen pressure detection device 100 are constituted of a metallic piece and a metallic rod, as described above. Therefore, depending on accuracy of attachment or a manner of handling of these first and second terminals 104 and 105 when the first and second terminals 104 and 105 are attached to the pen pressure detection device 100, the fixed position of the pen pressure detection device 100 with respect to the printed circuit board may be a position displaced from a proper predetermined position.

Hence, in the case of the conventional pen pressure detection device 100, the accuracy of attachment when the first and second terminals 104 and 105 are attached to the pen pressure detection device 100 is a major problem, and manufacturing requires skill and extreme caution and takes time and effort.

In addition, in the conventional pen pressure detection device 100, conductive metallic parts are used as the first and second terminals 104 and 105 to thereby enhance durability against high pressure and secure conductivity at the same time. However, processes are increased to fabricate the pen pressure detection device 100 constituted of a plurality of parts including metallic parts, and the precision of the whole of the fabricated pen pressure detection device 100 varies. Further, the metallic terminals 104 and 105 of the pen pressure detection device 100 need to be securely attached to the conductor patterns on the printed circuit board by soldering to transmit a signal from the pen pressure detection device 100 to the pen pressure detecting circuit on the printed circuit board.

Moreover, with recent miniaturization of portable terminals, electronic pens used with the portable terminals are also desired to be thinned. Therefore, pen pressure detection devices are desired to be miniaturized. The durability, precision, and electric connectivity of the above-described pen pressure detection device are important problems.

In view of the above problems, it is an object of the present disclosure to provide a pen pressure detection device that enables accuracy of assembly of parts to be ensured easily and which can maintain strength of connection to a printed circuit board even when a high pen pressure is applied.

Technical Solution

In order to solve the above problems, according to the present disclosure, there is provided a pen pressure detection device including:
  a pressure including electrodes which, in operation, output electrical information corresponding to an applied pressure; and
  a holder configured to retain the pressure sensor, and electrically connect the retained pressure sensor to a circuit board having a circuit which, in operation, detects the applied pressure based on the electrical information output from the pressure sensor;
  the holder including a first portion that retains the pressure sensor and a second portion that engages with the circuit board, the holder having a surface on which wiring is formed, the wiring extending from the first portion to the second portion, and the electrodes of the pressure sensor being electrically connected to the circuit board via the wiring when the holder and the circuit board are engaged with each other.

The pen pressure detection device according to the disclosure having the above-described constitution includes the holder having the first portion that retains the pressure sensor and the second portion that engages with the circuit board. In addition, the wiring extending from the first portion to the second portion is formed on the surface of the holder. When the holder and the circuit board are engaged with each other, the electrodes of the pressure sensor are electrically connected to the circuit board via the wiring.

Hence, according to the pen pressure detection device in accordance with the present disclosure, the electrodes of the pressure sensor can be electrically connected to the circuit board by housing and retaining the pressure sensor in the first portion of the holder and engaging the holder with the circuit board. Therefore, it is not necessary to assemble terminals as independent metallic members as in the conventional example, and a high accuracy of attachment of the terminals on the pen pressure detection device is easily achieved.

In addition, because the electrodes of the pressure sensor in the pen pressure detection device are electrically connected to the circuit board via lines formed on the holder, positioning can be performed with ease and with high accuracy in an electric connection between the pen pressure detection device and the printed circuit board. In addition, because the lines that electrically connect the electrodes of the pressure sensor to the circuit board are formed on the surface of the holder, strength can be ensured against an applied pen pressure.

Further, when the holder of the pen pressure detection device and the printed circuit board are engages with each other, the pressure sensor retained in the first portion and the circuit board are electrically connected to each other. Hence, electric connection between the pressure sensor retained in the holder of the pen pressure detection device and the circuit board is made with ease and with high accuracy.

In addition, in the present disclosure, the holder can be an injection molded product of resin with two terminals formed as three-dimensional fine patterns on the injection molded product.

In such a case, the two terminals are formed integrally with the holder, and do not need to be assembled as separate parts. Therefore, it is not necessary to perform assembly while caring about accuracy of attachment of the two terminal members as in the conventional example. Assembly of the high-precision pen pressure detection device is thus facilitated.

Advantageous Effect

According to the present disclosure, it is possible to provide a pen pressure detection device that enables accuracy of assembly of parts to be ensured easily and which can maintain strength of connection to a printed circuit board even when a high pen pressure is applied.

DETAILED DISCLOSURE

Embodiments of a pen pressure detection device according to the present disclosure will hereinafter be described with reference to the drawings in conjunction with embodiments of an electronic pen. Description will first be made of an embodiment in a case where a position indicated by an electronic pen is transmitted to a position detection device by an electromagnetic induction system.

Figure 2:
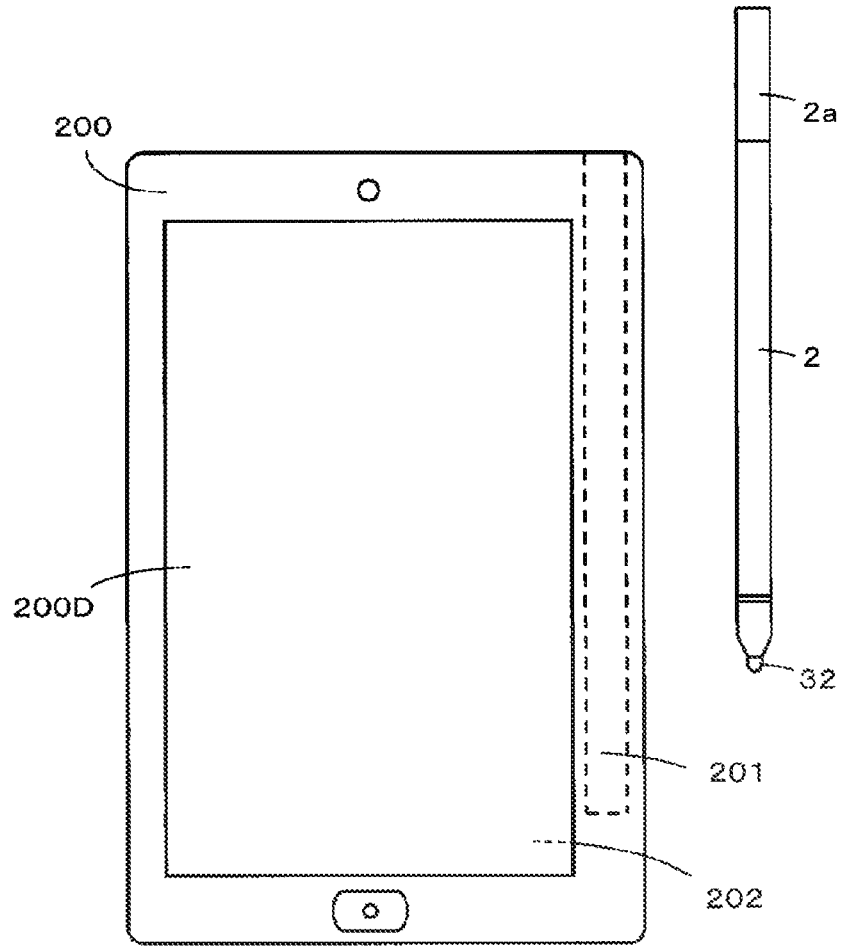
FIG. 2 is a diagram of assistance in explaining an example of an electronic apparatus using the electronic pen according to an embodiment of the present disclosure.

FIG. 2 depicts an example of an electronic apparatus 200 using an electronic pen 1 according to the present embodiment. In the present example, the electronic apparatus 200 is an advanced mobile telephone terminal having a display screen 200D of a display device such as a liquid crystal display (LCD) for example. The electronic apparatus 200 includes a position detection device 202 of an electromagnetic induction type under (on the back side of) the display screen 200D.

The casing of the electronic apparatus 200 in the present example has a housing recessed hole 201 in which the electronic pen 1 is housed. As required, a user extracts the electronic pen 1 housed in the housing recessed hole 201 from the electronic apparatus 200, and performs a position indicating operation with the display screen 200D as an input surface.

In the electronic apparatus 200, when a position indicating operation is performed by the electronic pen 1 on the display screen 200D, the position detection device 202 disposed on the back side of the display screen 200D detects a position indicated by the electronic pen 1 and a pen pressure, and a microcomputer included in the position detection device 202 of the electronic apparatus 200 performs display processing according to the position indicated on the display screen 200D and the pen pressure.

In the electronic pen 1 according to the present embodiment, a plurality of parts of the electronic pen 1 are arranged in an axial direction and housed within a hollow portion of a tubular case (casing) 2 formed of a resin, for example. One end side of the tubular case 2 has a tapered shape, and an end portion on the one end side of the tubular case 2 has an opening (not depicted in FIG. 2). A tip end portion 32 of a core body 3 to be described later is exposed as a pen tip through the opening. An opposite side of the case 2 from the pen tip side is closed by being fitted with a case cap 2a.

Figure 1:
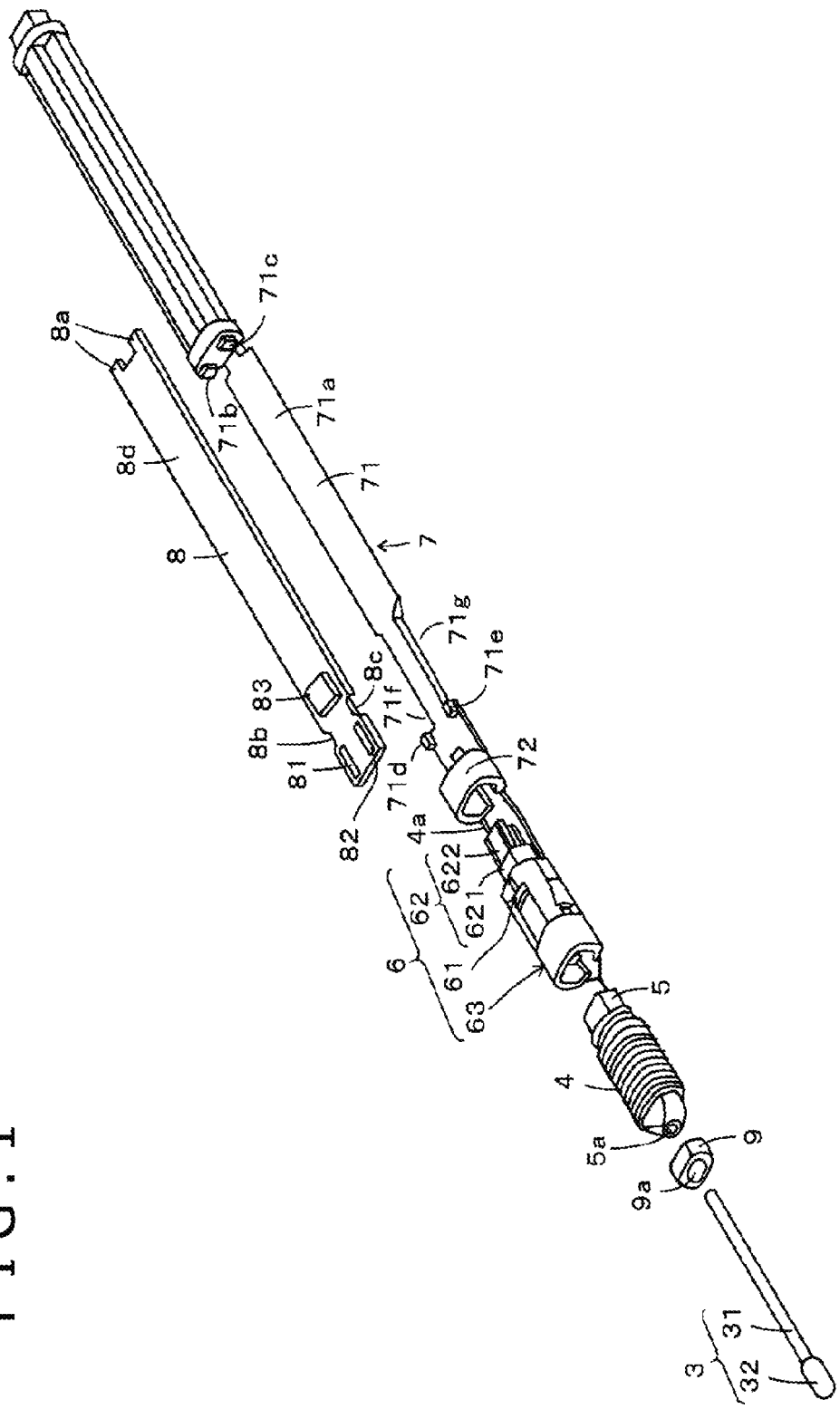
FIG. 1 is an exploded perspective view of assistance in explaining an example of an internal constitution of an electronic pen according to an embodiment of the present disclosure.

FIG. 1 is an exploded perspective view in which a group of parts housed within the case 2 of the electronic pen 1 are arranged with each part separated from the other parts. In the present embodiment, an external shape in a direction orthogonal to the central axis of the case 2 (which external shape is equal to the contour shape of a cross section of the case 2) is a flat shape. The cross-sectional shape of the hollow portion within the case 2 also has a flat shape corresponding to the external shape of the case 2, and parts housed within the case 2 also have a shape corresponding to the flat shape of the hollow portion.

As depicted in FIG. 1, a magnetic core wound with a coil 4, or a ferrite core 5 in the present example, a pen pressure detection device 6, and a board holder 7 are arranged within the hollow portion of the case 2 in the axial direction in order from the pen tip side. A printed circuit board 8 is mounted on and locked to a board mounting base portion 71 of the board holder 7. The printed circuit board 8 is an example of a circuit board.

The ferrite core 5 in the present example has a columnar shape having a through hole 5a at the position of the central axis, the through hole 5a having a diameter slightly larger than the diameter of a core body main body portion 31 of the core body 3 so that the core body main body portion 31 is inserted through the through hole 5a. In the present embodiment, the ferrite core 5 has a flat cross-sectional shape corresponding to the cross-sectional shape of the hollow portion of the case 2, and the pen tip side of the ferrite core 5 is formed in a tapered shape so as to taper off.

One end 4a and another end 4b of the coil 4 (a winding starting end and a winding ending end of the coil 4) wound around the ferrite core 5 are extended in the axial direction on the opposite side from the pen tip side to be capable of being soldered to the printed circuit board 8 mounted on the board holder 7.

The pen pressure detection device 6 in the present embodiment includes a pressure sensor 61 constituted of a plurality of pressure sensing parts to be described later, a holder 62, and an engaging member 63. The holder 62 is formed of an insulative material, for example a resin. The holder 62 integrally includes: a retaining portion 621 that retains the pressure sensor 61; and a connecting portion 622 that electrically connects two electrodes of the pressure sensor 61 retained by the retaining portion 621 to the printed circuit board 8 mounted on the board holder 7. As will be described later, the connecting portion 622 of the holder 62 is an engaging portion that engages with the printed circuit board 8.

The engaging member 63 engages with the retaining portion 621 of the holder 62, and thereby causes the plurality of pressure sensing parts of the pressure sensor 61 to be retained by the retaining portion 621 of the holder 62. The engaging member 63 also has a fitting portion for being fitted with and retaining the ferrite core 5. The fitting portion of the engaging member 63 which fitting portion is fitted with and retains the ferrite core 5 is fitted with an end portion of the ferrite core 5 which end portion is on an opposite side from the tapered portion of the ferrite core 5, so that the pen pressure detection device 6 and the ferrite core 5 wound with the coil 4 are coupled to each other.

The board holder 7 is formed of an insulative material, for example a resin. The board holder 7 includes the board mounting base portion 71 and a fitting portion 72 to be fitted with the pen pressure detection device 6.

The board mounting base portion 71 of the board holder 7 has a mounting surface 71a on which the printed circuit board 8 is mounted with the long side direction of the printed circuit board 8 of an elongate rectangular shape set in the axial direction of the electronic pen 1. In addition, the board mounting base portion 71 has projecting portions 71b and 71c at the position of an end portion on the case cap 2a side of the mounting surface 71a, the projecting portions 71b and 71c sandwiching end portions 8a on the case cap 2a side of the printed circuit board 8 together with the mounting surface 71a. In addition, the board mounting base portion 71 has projecting portions 71d and 71e projecting upwardly from the mounting surface 71a in the vicinity of an end portion on the pen tip side of the mounting surface 71a to lock an end portion on the pen tip side of the printed circuit board 8.

On the other hand, in the vicinity of the end portion on the pen tip side of the printed circuit board 8, notch portions 8b and 8c are formed at positions corresponding to the projecting portions 71d and 71e on the mounting surface 71a of the board mounting base portion 71 so as to engage with the projecting portions 71d and 71e. The printed circuit board 8 is locked to the board mounting base portion 71 when the end portions 8a on the case cap 2a side are coupled so as to be sandwiched between the projecting portions 71b and 71c of the board mounting base portion 71 and the mounting surface 71a and the notch portions 8b and 8c are mounted so as to engage with the projecting portions 71d and 71e of the board mounting base portion 71.

In addition, the fitting portion 72 of the board holder 7 in the present embodiment has a tubular shape having a hollow portion into which the connecting portion 622 of the holder 62 of the pen pressure detection device 6 is inserted. As will be described later, two terminal members on the connecting portion 622 of the holder 62, which terminal members are connected to the two electrodes of the pressure sensor 61, are formed so as to be connected to conductor patterns 81 and 82 formed on the printed circuit board 8.

As will be described later, when the connecting portion 622 of the holder 62 of the pen pressure detection device 6 is inserted into the fitting portion 72, the connecting portion 622 engages with the printed circuit board 8 mounted on the board mounting base portion 71 so as to sandwich the printed circuit board 8 in a board thickness direction of the printed circuit board 8. Consequently, the two electrodes of the pressure sensor 61 retained by the pen pressure detection device 6 are electrically connected to the conductor patterns 81 and 82 formed on a board surface 8d of the printed circuit board 8 through the two terminal members of the connecting portion 622. As will be described later, the two terminal members of the connecting portion 622 of the holder 62 of the pen pressure detection device 6 are brought into contact with and electrically connected to the conductor patterns 81 and 82 of the printed circuit board 8 by the fitting and coupling of the pen pressure detection device 6 to the board holder 7 and the printed circuit board 8. In the present embodiment, however, the two terminal members are soldered to the conductor patterns 81 and 82 to make the electric connection more secure.

Incidentally, the electronic pen 1 according to the present embodiment uses a resonance circuit constituted of the coil 4 wound around the ferrite core 5 and a capacitor in order to transmit a position indicated by the electronic pen 1 to the position detection device 202. The capacitor 83 constituting the resonance circuit is formed on the board surface 8d of the printed circuit board 8. The pen pressure detection device 6 according to the present embodiment uses, as the pressure sensor 61, a variable capacitance capacitor exhibiting a capacitance corresponding to a pen pressure. In the electronic pen 1, the variable capacitance capacitor of the pressure sensor 61 of the pen pressure detection device 6 is connected to the resonance circuit to make the resonance frequency of the resonance circuit correspond to the pen pressure. The position detection device 202 corresponding to the electronic pen 1 has a function of detecting the pen pressure applied to the pen tip of the electronic pen 1 by detecting a change in the resonance frequency of an electromagnetic coupling signal from the electronic pen 1. The above-described conductor patterns 81 and 82 are terminal portions for connecting the variable capacitance capacitor formed by the pressure sensor 61 of the pen pressure detection device 6 to the resonance circuit.

As described above, the ferrite core 5 is fitted and coupled to the engaging member 63 of the pen pressure detection device 6, and then the connecting portion 622 of the holder 62 of the pen pressure detection device 6 is coupled to the printed circuit board 8 via the fitting portion 72 of the board holder 7. Thus, the ferrite core 5 wound around the coil 4, the pen pressure detection device 6, and the board holder 7 retaining the printed circuit board 8 are coupled to each other to constitute one module (pen module part).

Incidentally, in this case, as will be described later, the one end 4a and the other end 4b of the coil 4 wound around the ferrite core 5 are passed on the outside of the pen pressure detection device 6, extended onto a surface of the printed circuit board 8 which surface is on an opposite side from the board surface 8d, and soldered to conductor patterns formed on the opposite side from the board surface 8d. The conductor patterns formed on the opposite side from the board surface 8d are connected in parallel with the capacitor 83 formed on the board surface 8d through through holes formed in the printed circuit board 8. The resonance circuit is thus formed.

Then, the pen module part in which the ferrite core 5, the pen pressure detection device 6, and the board holder 7 retaining the printed circuit board 8 described above are coupled to each other to constitute one module is housed within the hollow portion of the case 2 of the electronic pen 1. In this case, the tapered portion of the ferrite core 5 is located in the vicinity of an opening portion on the pen tip side of the hollow portion of the case 2. In the present embodiment, however, the tapered portion of the ferrite core 5 is covered and protected by a protective cap 9.

Incidentally, in the present embodiment, when the ferrite core 5 wound with the coil 4 is fitted to the fitting portion of the engaging member 63 of the pen pressure detection device 6, the center line position in the axial direction of the pen pressure detection device 6 and the center line position in the axial direction of the ferrite core 5 coincide with each other. Then, when the pen pressure detection device 6 is fitted to the fitting portion 72 of the board holder 7, and the pen pressure detection device 6 is thereby coupled to the printed circuit board 8, the pen pressure detection device 6 is coupled at a predetermined position to the board holder 7 and the printed circuit board 8. In addition, in a state in which the pen module part is housed within the hollow portion of the case 2, the board holder 7 is coupled to the case cap 2a such that the center line position in the axial direction of the pen pressure detection device 6 and the center line position in the axial direction of the ferrite core 5 coincide with the center line position in the axial direction of the hollow portion of the case 2.

Then, the core body main body portion 31 of the core body 3 is inserted through an opening (not depicted) of the case 2 and a through hole 9a of the protective cap 9, and further through the through hole 5a of the ferrite core 5, and is engaged with the pressure sensor 61 of the pen pressure detection device 6. In this case, the core body 3 is formed of a resin as an example of a hard nonconductive material, for example polycarbonate, a synthetic resin, an acrylonitrile-butadiene-styrene (ABS) resin, or the like, to be able to transmit a pressure (pen pressure) applied to the tip end portion 32 to the pressure sensor 61 of the pen pressure detection device 6. The core body 3 is insertable into and detachable from the electronic pen 1.

Description of Embodiment of Pen Pressure Detection Device

Figure 3:
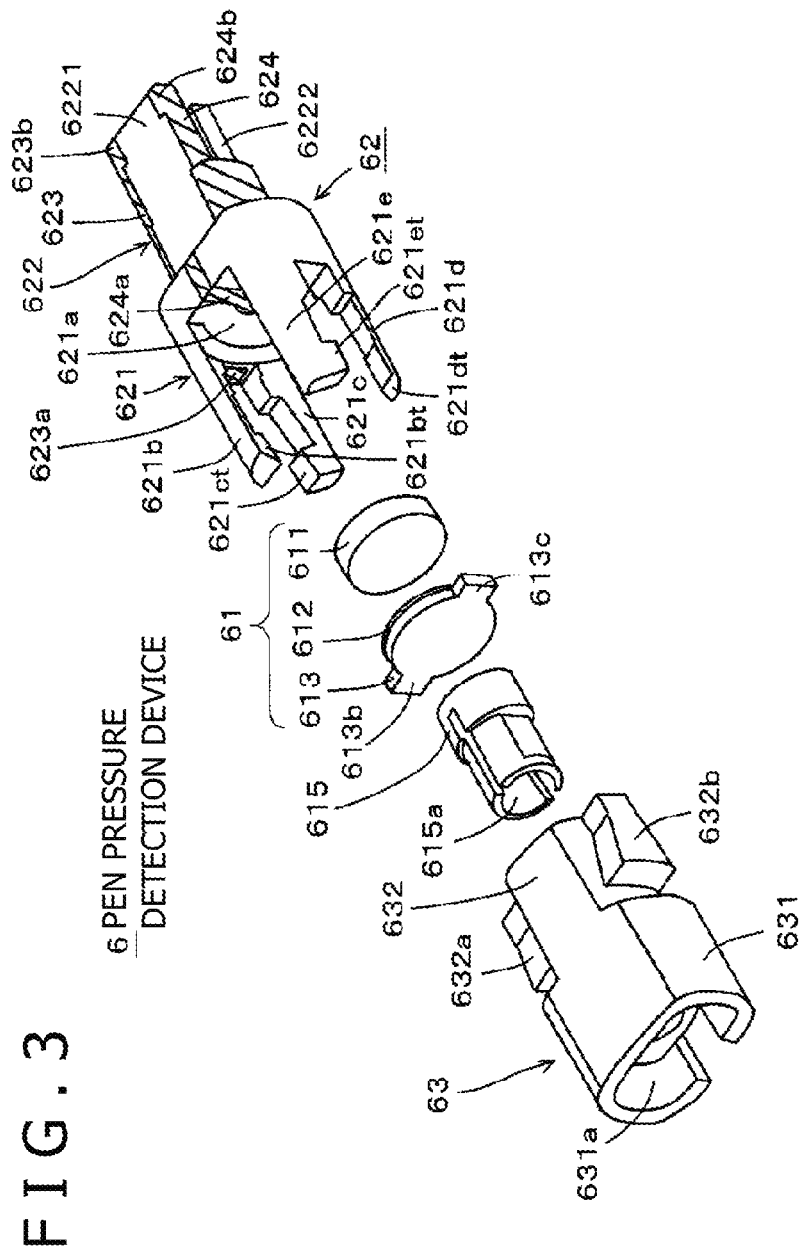
FIG. 3 is an exploded perspective view of assistance in explaining an example of constitution of a pen pressure detection device according to an embodiment of the present disclosure.
Figure 5:
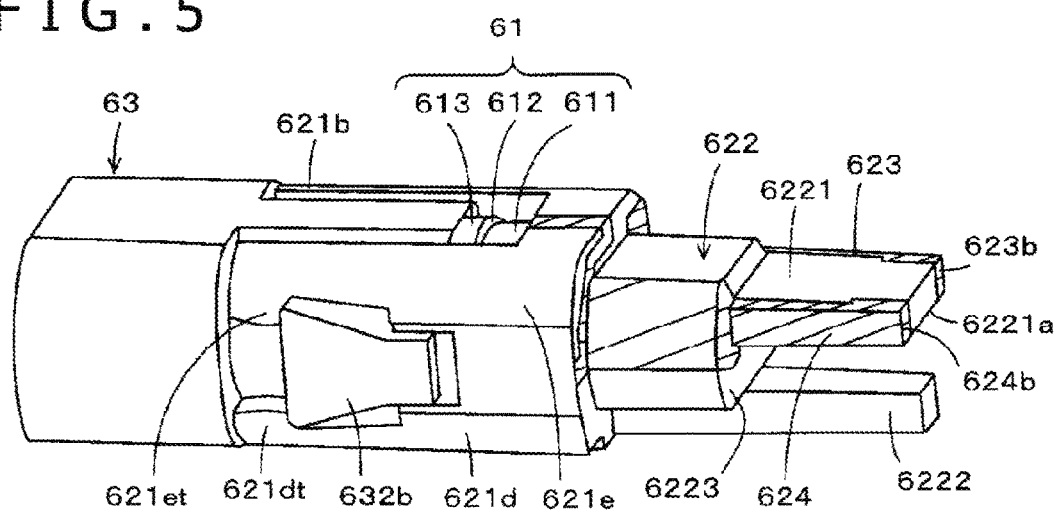
FIG. 5 is a perspective view of a state in which constituent parts of the pen pressure detection device depicted in FIG. 3 are assembled.
Figure 6:
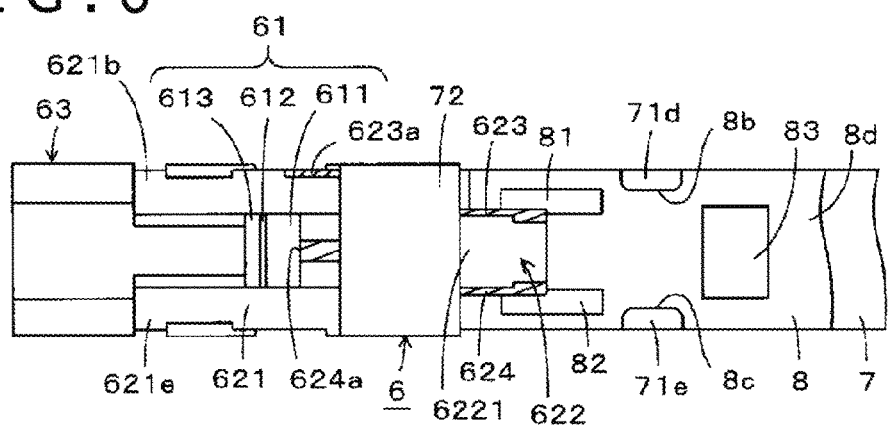
FIG. 6 is a view of a fitted portion when the pen pressure detection device depicted in FIG. 3 is fitted to a board holder as viewed from above perpendicularly to the board surface of a printed circuit board.
Figure 7:
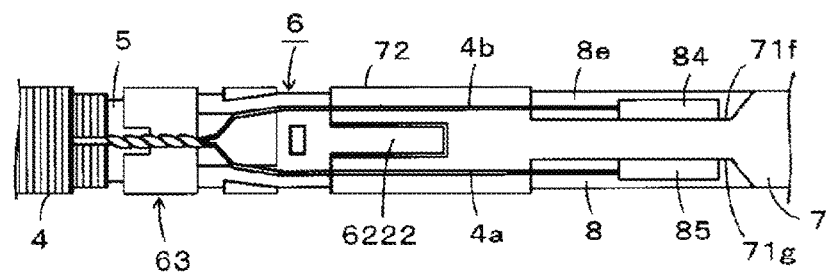
FIG. 7 is a view of the fitted portion when the pen pressure detection device depicted in FIG. 3 is fitted to the board holder as viewed from a back side perpendicularly to the board surface of the printed circuit board.

FIG. 3 is an exploded perspective view of assistance in explaining an example of constitution of the pen pressure detection device 6. FIG. 4 is a diagram of assistance in explaining a group of pressure sensing parts. In addition, FIG. 5 is a perspective view of a state in which the constituent parts of the pen pressure detection device 6 depicted in FIG. 3 are assembled. In addition, FIG. 6 is a view of a fitted portion when the pen pressure detection device 6 is fitted to the board holder 7 as viewed from above perpendicularly to the board surface 8d of the printed circuit board 8. FIG. 7 is, on the other hand, a view as viewed from a back side perpendicularly to the board surface 8d of the printed circuit board 8.

As depicted in FIG. 3 and FIG. 4, the pressure sensor 61 in the present embodiment includes a dielectric 611, a spacer 612, and a conductive elastic body 613.

Figure 4A:
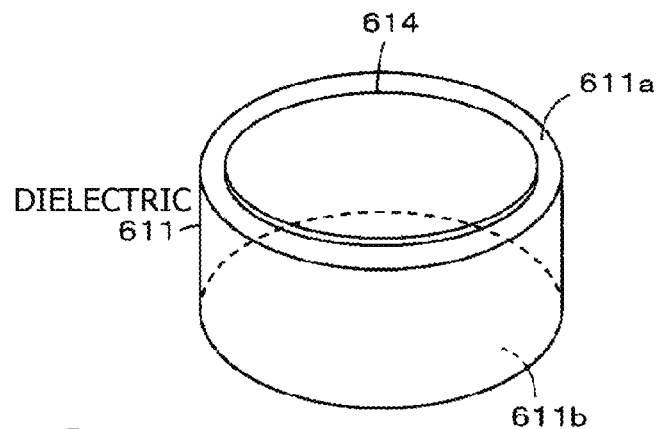
FIGS. 4A, 4B, and 4C are diagrams of assistance in explaining a group of pressure sensing parts used in the pen pressure detection device according to an embodiment of the present disclosure.

As depicted in FIG. 4A, the dielectric 611 for example has substantially the shape of a disk. The dielectric 611 has one circular surface 611a and another circular surface 611b that face each other. A circular conductor layer 614 is formed on the one surface 611a of the dielectric 611. The conductor layer 614 constitutes a first electrode of the variable capacitance capacitor as the pressure sensor 61 in the present example.

Figure 4B:
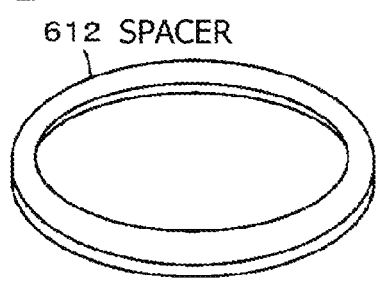

The spacer 612 is formed of an insulative material. As depicted in FIG. 4B, the spacer 612 is a thin plate body having a ring shape whose outside diameter is equal to the diameter of the dielectric 611.

Figure 4C:
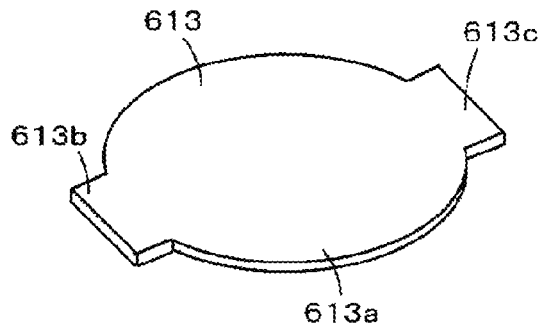

The conductive elastic body 613 in the present example is formed of an elastic rubber. The conductive elastic body 613 in the present example is configured to serve as both the second electrode conductor and the elastic member described in the conventional example at the beginning hereof. As depicted in FIG. 4C, the conductive elastic body 613 has a shape obtained by forming two projecting portions 613b and 613c from peripheral edges of a thin plate body 613a having the shape of a disk whose outside diameter is equal to the diameter of the dielectric 611, the peripheral edges being separated from each other at an angular interval of 180 degrees. The spacer 612 is for example bonded to the discoid plate body 613a of the conductive elastic body 613.

Then, the variable capacitance capacitor as the pressure sensor 61 in the present example is formed by superposing the conductive elastic body 613 on the other surface 611b side of the dielectric 611 with the spacer 612 interposed therebetween. The variable capacitance capacitor as the pressure sensor 61 in the present example includes the first electrode constituted by the conductor layer 614 formed on the one surface 611a of the dielectric 611 and a second electrode constituted by the conductive elastic body 613.

The holder 62 of the pen pressure detection device 6 is configured, as for example an injection molded product produced by using resin, to integrally include the retaining portion 621 and the connecting portion 622. In the present embodiment, two terminal members 623 and 624 (depicted hatched in FIG. 3, FIG. 5, and FIG. 6 to facilitate understanding) are formed on the holder 62 as conductive three-dimensional fine patterns from the retaining portion 621 to the connecting portion 622 along the direction of application of a pen pressure, that is, the axial direction of the electronic pen 1. As a result, the terminal members 623 and 624 are integrally formed on the holder 62.

Here, microscopic integrated processing technology (MIPTEC) developed by Panasonic Corporation, for example, can be used as a method of forming the two terminal members 623 and 624 as three-dimensional fine patterns on the surface of the holder 62. In order to facilitate electric connection by contact, nickel plating layers are formed on the surfaces of the terminal members 623 and 624 formed as three-dimensional fine patterns, and further gold plating layers are formed on the nickel plating layers.

The retaining portion 621 of the holder 62 includes a recessed portion 621a housing the pressure sensor 61 in which the dielectric 611, the spacer 612, and the conductive elastic body 613 are coupled to each other, and includes engaging projecting portions 621b, 621c, 621d, and 621e projecting in the axial direction from the recessed portion 621a to the engaging member 63 side (core body 3 side). One end portion 624a of the terminal member 624 is formed in an exposed state on a bottom portion of the recessed portion 621a (see a hatched portion in FIG. 3). The dielectric 611 is housed such that the conductor layer 614 formed on the one surface 611a abuts against the one end portion 624a of the terminal member 624 on the bottom portion of the recessed portion 621a. Hence, in a state in which the dielectric 611 is housed and retained within the recessed portion 621a, the conductor layer 614 as the first electrode of the pressure sensor 61 and the one end portion 624a of the terminal member 624 are in contact with each other and electrically connected to each other.

In addition, end surfaces against which the projecting portions 613b and 613c of the conductive elastic body 613 abut are formed between the engaging projecting portions 621b and 621c of the retaining portion 621 of the holder 62 and between the engaging projecting portions 621d and 621e. In the present embodiment, one end portion 623a of the terminal member 623 is formed in an exposed state on the end surface between the engaging projecting portions 621b and 621c (see a hatched portion in FIG. 3). Hence, in a state in which the conductive elastic body 613 is housed and retained within the recessed portion 621a together with the dielectric 611 and the spacer 612, the projecting portion 613b of the conductive elastic body 613 abuts against the one end portion 623a of the terminal member 623. The conductive elastic body 613 and the terminal member 623 are thereby in contact with each other and electrically connected to each other.

Thus, in the present embodiment, when the pressure sensor 61 is housed and retained in the retaining portion 621 of the holder 62, the first electrode and the second electrode of the pressure sensor 61 are automatically electrically connected to the two terminal members 623 and 624 of the connecting portion 622.

The engaging member 63 of the pen pressure detection device 6 includes a fitting portion 631 fitted with the ferrite core 5 wound with the coil 4 and an engaging portion 632 engaging with the retaining portion 621 of the holder 62. As depicted in FIG. 7, the fitting portion 631 has a fitting recessed hole 631a fitted with and housing a part of the ferrite core 5.

The engaging portion 632 of the engaging member 63 has a through hole, not depicted, in the axial direction, which through hole communicates with the fitting recessed hole 631a of the fitting portion 631. The engaging portion 632 slidably houses, in the axial direction within the through hole, a pressing member 615 as a pen pressure transmitting member that transmits a pen pressure to the pressure sensor

61. The pressing member 615 is formed of an insulative material, for example a resin.

The pressing member 615 has a recessed portion 615a in which an end portion of the core body main body portion 31 of the core body 3 is inserted and fitted. The end portion of the core body main body portion 31 of the core body 3 is press-fitted into the recessed portion 615a of the pressing member 615, but can also be pulled out. When a pen pressure is applied to the tip of the core body 3, the pen pressure is transmitted to the pressing member 615, and the pressing member 615 presses the discoid plate body 613a of the conductive elastic body 613 in the axial direction according to the pen pressure. Therefore, the conductive elastic body 613 and the dielectric 611 spaced apart via the spacer 612 come into contact with each other, and the area of the contact changes according to the pen pressure. A capacitance corresponding to the area of the contact between the conductive elastic body 613 and the dielectric 611 is obtained between the first electrode and the second electrode of the pressure sensor 61.

The engaging portion 632 of the engaging member 63 also has an engaging protrusion 632a and an engaging protrusion 632b formed thereon, the engaging protrusion 632a engaging with the engaging projecting portions 621b and 621c of the retaining portion 621 of the holder 62, and the engaging protrusion 632b engaging with the engaging projecting portions 621d and 621e. Engaging pawl portions 621bt and 621ct that engage with the engaging protrusion 632a are formed at ends of the engaging projecting portions 621b and 621c of the retaining portion 621 of the holder 62. In addition, engaging pawl portions 621dt and 621et that engage with the engaging protrusion 632b are formed at ends of the engaging projecting portions 621d and 621e.

Then, when the engaging member 63 is coupled to the holder 62 in the axial direction in a state in which the pressure sensor 61 is housed in the retaining portion 621 of the holder 62, the engaging member 63 and the holder 62 are coupled to each other, and thereby the pressure sensor 61 is retained by the retaining portion 621 of the holder 62, as depicted in FIG. 5. At this time, the engaging pawl portions 621bt and 621ct at the ends of the engaging projecting portions 621b and 621c of the retaining portion 621 of the holder 62 are engaged with the engaging protrusion 632a of the engaging member 63, and the engaging pawl portions 621dt and 621et at the ends of the engaging projecting portions 621d and 621e are engaged with the engaging protrusion 632b. The engaging member 63 is thus engaged with the retaining portion 621 of the holder 62. Thereby, the engaging member 63 is locked to the holder 62, and the engaging member 63 and the holder 62 are coupled to each other.

In the retaining portion 621, as described earlier, in the state in which the engaging member 63 is engaged with the holder 62, the conductor layer 614 (first electrode) on the one end surface 611a of the dielectric 611 of the pressure sensor 61 is electrically connected to the terminal member 624, and the projecting portion 613b of the conductive elastic body 613 (second electrode) is electrically connected to the terminal member 623.

The connecting portion 622 of the holder 62 includes a plate-shaped projecting portion 6221 that projects in the axial direction (same direction as the direction of application of a pen pressure) parallel with the board surface 8d of the printed circuit board 8. The projecting portion 6221 has a flat surface 6221a (see FIG. 5) parallel with the board surface 8d of the printed circuit board 8. The flat surface 6221a of the projecting portion 6221 is provided so as to come precisely into contact with the board surface 8d when the pen pressure detection device 6 is fitted into the board holder 7 and engaged with the printed circuit board 8.

As depicted in FIG. 3 and FIG. 5, the two terminal members 623 and 624 on the projecting portion 6221 are formed at both end edges in a short side direction of the flat surface 6221a (end portions in a direction orthogonal to the direction of application of a pen pressure) along long sides in the direction of application of a pen pressure in a state of being separated from each other. The two terminal members 623 and 624 are formed so as to be exposed at least on the flat surface 6221a side of the projecting portion 6221.

In addition, as depicted in FIG. 3 and FIG. 5, a protruding portion 6222 projecting in the same direction as the plate-shaped projecting portion 6221 is formed on the connecting portion 622. The protruding portion 6222 is formed in positional relation such that the printed circuit board 8 is precisely sandwiched between the protruding portion 6222 and the flat surface 6221a of the projecting portion 6221 in the board thickness direction. In this case, the protruding portion 6222 may be formed such that a distance from the protruding portion 6222 to the projecting portion 6221 side is gradually decreased slightly toward the tip side of the protruding portion 6222. The protruding portion 6222 may be thus configured to displace the printed circuit board 8 to the projecting portion 6221 side at all times by the elastic force of the protruding portion 6222.

In addition, in the present embodiment, an abutting surface 6223 (see FIG. 5) against which an end edge in a long side direction of the printed circuit board 8 (end edge in the direction of application of a pressure) abuts is formed between a base of the projecting portion 6221 of the connecting portion 622 and a base of the protruding portion 6222.

Hence, when the pen pressure detection device 6 is fitted to the board holder 7, the projecting portion 6221 and the protruding portion 6222 sandwich the printed circuit board 8 in the board thickness direction, and the end edge in the long side direction of the printed circuit board 8 (end edge in the direction of application of a pressure) abuts against the abutting surface 6223 between the projecting portion 6221 and the protruding portion 6222 of the connecting portion 622. The case cap 2a renders the board holder 7 unmovable in the direction of application of a pen pressure applied to the core body 3. Therefore, the abutment between the end edge in the long side direction of the printed circuit board 8 and the abutting surface 6223 of the connecting portion 622 prevents the pen pressure detection device 6 from moving in the axial direction within the case 2 of the electronic pen 1.

In a fitted state between the pen pressure detection device 6 and the board holder 7, the connecting portion 622 and the printed circuit board 8 engage with each other. In the state in which the connecting portion 622 and the printed circuit board 8 engage with each other, as depicted in FIG. 6, the two terminal members 623 and 624 formed at both end edges in the short side direction of the projecting portion 6221 so as to be exposed on the surface of the flat surface 6221a are in contact with and electrically connected to the conductor patterns 81 and 82 formed on the board surface 8d of the printed circuit board 8.

In the present embodiment, as depicted in FIG. 6, each of the conductor patterns 81 and 82 formed on the printed circuit board 8 is formed so as to extend along the direction of application of a pen pressure. The two terminal members 623 and 624 of the pen pressure detection device 6 are also formed on the projecting portion 6221 of the connecting portion 622 so as to extend along the direction of application of a pen pressure. Therefore, the two terminal members 623 and 624 are securely electrically connected to the conductor patterns 81 and 82. Hence, the two terminal members 623 and 624 can be electrically connected to the conductor patterns 81 and 82 without soldering. In the present embodiment, however, the two terminal members 623 and 624 are soldered and thus more securely electrically connected to the conductor patterns 81 and 82. Then, as a result of the soldering, the pen pressure detection device 6 and the printed circuit board 8 locked to the board holder 7 are fixed to each other.

As described above, according to the present embodiment, by merely fitting the pen pressure detection device 6 to the board holder 7 to which the printed circuit board 8 is locked, the two terminal members 623 and 624 of the pen pressure detection device 6 are brought into contact with and electrically connected to the conductor patterns 81 and 82 formed on the board surface 8d of the printed circuit board 8. That is, alignment for electric connection between the two terminal members 623 and 624 of the pen pressure detection device 6 and the conductor patterns 81 and 82 of the printed circuit board 8 is automatically performed by merely fitting the pen pressure detection device 6 to the board holder 7.

Moreover, merely fitting the pen pressure detection device 6 to the board holder 7 to which the printed circuit board 8 is locked causes the end edge in the long side direction of the printed circuit board 8 (end edge in the direction of application of a pressure) to abut against the end surface 6223 between the projecting portion 6221 and the protruding portion 6222 of the connecting portion 622, as described above. The pen pressure detection device 6 and the board holder 7 therefore integrally receive an applied pen pressure. Thus, electric connection parts between the pen pressure detection device 6 and the printed circuit board 8 are not affected by the application of the pen pressure.

As depicted in FIG. 7, the ferrite core 5 wound with the coil 4 is fitted into the recessed hole 631a of the fitting portion 631 of the engaging member 63 of the pen pressure detection device 6. When the pen pressure detection device 6 and the board holder 7 are fitted to each other in a state in which the ferrite core 5 wound with the coil 4 is thus fitted to the pen pressure detection device 6, the one end 4a and the other end 4b of the coil 4 wound around the ferrite core 5 fitted to the pen pressure detection device 6 are disposed so as to extend on the back side of the board mounting base portion 71 of the board holder 7, as depicted in FIG. 7.

As depicted in FIG. 7, conductor patterns 84 and 85 to which to connect the one end 4a and the other end 4b of the coil 4 are formed on a surface 8e of the printed circuit board 8 which surface is on an opposite side from the board surface 8d. The conductor patterns 84 and 85 are exposed to the outside due to notch portions 71f and 71g formed in the board mounting base portion 71 of the board holder 7. The one end 4a and the other end 4b of the coil 4 are soldered to the exposed conductor patterns 84 and 85. The conductor patterns 84 and 85 are connected to both ends of the capacitor 83 formed on the board surface 8d through through holes not depicted. Hence, when the one end 4a and the other end 4b of the coil 4 are soldered to the conductor patterns 84 and 85, the coil 4 and the capacitor 83 form a parallel resonance circuit.

[Circuit Configuration for Detecting Position and Pen Pressure of Electronic Pen 1 in Position Detection Device 202]

Figure 8:
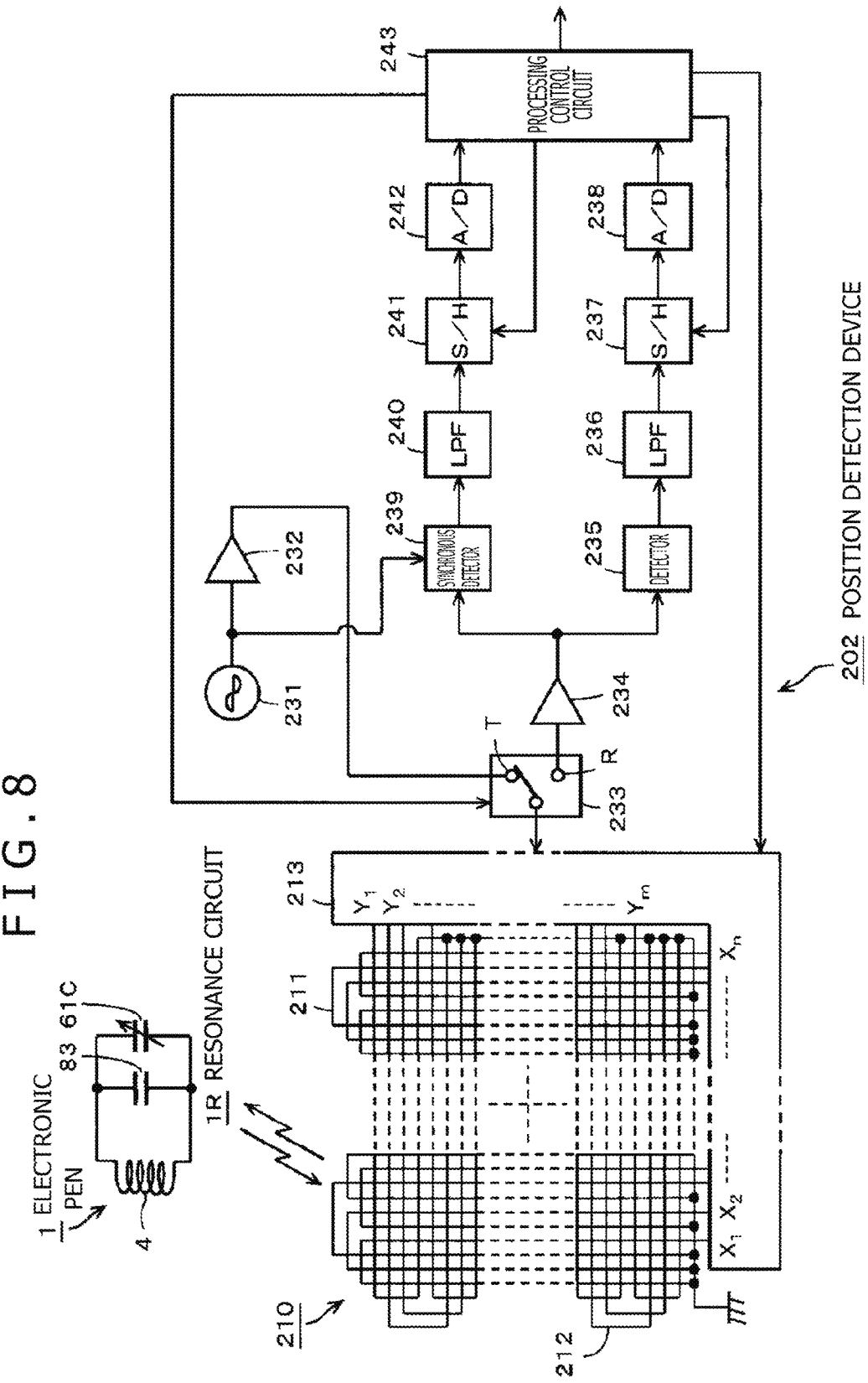
FIG. 8 is a diagram depicting an example of a circuit configuration of a position detection device used in conjunction with the electronic pen according to an embodiment of the present disclosure.

An example of a circuit configuration in the position detection device that detects an indicated position and detects a pen pressure by using the electronic pen 1 according to the above-described embodiment will next be described with reference to FIG. 8. FIG. 8 is a block diagram depicting an example of a circuit configuration of the position detection device 202 in the present example.

The electronic pen 1 includes a resonance circuit 1R formed by a parallel circuit of the coil 4, the capacitor 83, and the variable capacitance capacitor 61C formed by the pressure sensor 61 of the pen pressure detection device 6. In this case, the capacitance of the variable capacitance capacitor formed by the pressure sensor 61 of the pen pressure detection device 6 changes according to an applied pen pressure. The resonance frequency of the resonance circuit 1R therefore changes according to the pen pressure.

The position detection device 202 detects a position on a sensor which position is indicated by the electronic pen 1 from the position on the sensor at which position a signal received from the resonance circuit 1R of the electronic pen 1 by electromagnetic coupling is detected, and detects a pen pressure applied to the core body 3 of the electronic pen 1 by detecting a change in phase of the signal received from the resonance circuit 1R of the electronic pen 1 by electromagnetic coupling and thereby detecting a change in the resonance frequency.

The position detection device 202 has a position detecting coil 210 formed thereon by stacking an X-axis direction loop coil group 211 and a Y-axis direction loop coil group 212. The position detection device 202 is also provided with a selection circuit 213 to which the X-axis direction loop coil group 211 and the Y-axis direction loop coil group 212 are connected. The selection circuit 213 sequentially selects one loop coil of the two loop coil groups 211 and 212.

The position detection device 202 further includes an oscillator 231, a current driver 232, a switch connection circuit 233, a reception amplifier 234, a detector 235, a low-pass filter 236, a sample and hold circuit 237, an analog to digital (A/D) converter circuit 238, a synchronous detector 239, a low-pass filter 240, a sample and hold circuit 241, an A/D converter circuit 242, and a processing control circuit 243. The processing control circuit 243 is formed by a microcomputer.

The oscillator 231 generates an alternating-current signal of a frequency f0. The oscillator 231 then supplies the generated alternating-current signal to the current driver 232 and the synchronous detector 239. The current driver 232 converts the alternating-current signal supplied from the oscillator 231 into a current, and sends out the current to the switch connection circuit 233. The switch connection circuit 233 selects a connection destination (a transmitting side terminal T or a receiving side terminal R) to which to connect the loop coil selected by the selection circuit 213, under control of the processing control circuit 243. Of the connection destinations, the transmitting side terminal T is connected with the current driver 232, and the receiving side terminal R is connected with the reception amplifier 234.

An induced voltage generated in the loop coil selected by the selection circuit 213 is sent to the reception amplifier 234 via the selection circuit 213 and the switch connection circuit 233. The reception amplifier 234 amplifies the induced voltage supplied from the loop coil, and sends out the amplified induced voltage to the detector 235 and the synchronous detector 239.

The detector 235 detects the induced voltage generated in the loop coil, that is, a received signal, and sends out the received signal to the low-pass filter 236. The low-pass filter 236 has a cutoff frequency sufficiently lower than the above-mentioned frequency f0. The low-pass filter 236 converts the output signal of the detector 235 into a direct-current signal, and sends out the direct-current signal to the sample and hold circuit 237. The sample and hold circuit 237 holds a voltage value of the output signal of the low-pass filter 236 in predetermined timing, specifically predetermined timing during a reception period, and sends out the voltage value to the A/D converter circuit 238. The A/D converter circuit 238 converts the analog output of the sample and hold circuit 237 into a digital signal, and outputs the digital signal to the processing control circuit 243.

Meanwhile, the synchronous detector 239 performs synchronous detection of the output signal of the reception amplifier 234 by the alternating-current signal from the oscillator 231, and sends out, to the low-pass filter 240, a signal having a level corresponding to a phase difference between the output signal of the reception amplifier 234 and the alternating-current signal from the oscillator 231. The low-pass filter 240 has a cutoff frequency sufficiently lower than the frequency f0. The low-pass filter 240 converts the output signal of the synchronous detector 239 into a direct-current signal, and sends out the direct-current signal to the sample and hold circuit 241. The sample and hold circuit 241 holds a voltage value of the output signal of the low-pass filter 240 in predetermined timing, and sends out the voltage value to the A/D converter circuit 242. The A/D converter circuit 242 converts the analog output of the sample and hold circuit 241 into a digital signal, and outputs the digital signal to the processing control circuit 243.

The processing control circuit 243 controls various parts of the position detection device 202. Specifically, the processing control circuit 243 controls the selection of a loop coil in the selection circuit 213, the switching of the switch connection circuit 233, and the timing of the sample and hold circuits 237 and 241. The processing control circuit 243 makes a radio wave transmitted from the X-axis direction loop coil group 211 and the Y-axis direction loop coil group 212 for a certain transmission duration on the basis of the input signals from the A/D converter circuits 238 and 242.

A radio wave transmitted from the electronic pen 1 generates an induced voltage in each of loop coils of the X-axis direction loop coil group 211 and the Y-axis direction loop coil group 212. The processing control circuit 243 calculates the coordinate values of an indicated position in an X-axis direction and a Y-axis direction which position is indicated by the electronic pen 1 on the basis of the level of the voltage value of the induced voltage generated in each of the loop coils. In addition, the processing control circuit 243 detects a pen pressure on the basis of the level of the signal corresponding to the phase difference between the transmitted radio wave and the received radio wave.

Thus, the position detection device 202 can detect, by the processing control circuit 243, the position of the electronic pen 1 that has approached. Moreover, the electronic pen 1 can detect the pen pressure applied to the core body 3 of the electronic pen 1 by detecting the phase (frequency shift) of the received signal.

Effects of Embodiment

According to the pen pressure detection device 6 of the above-described embodiment, the two terminal members 623 and 624 are integrally formed on the surface of the connecting portion 622 of the holder 62 of the pen pressure detection device 6 fitted to the board holder 7. Therefore, it is not necessary to perform assembly while caring about accuracy of attachment of the two terminal members as in the conventional example. Assembly of the high-precision pen pressure detection device is thus facilitated.

In addition, by merely fitting the holder 62 of the pen pressure detection device 6 to the board holder 7 to which the printed circuit board 8 is locked, the two terminal members 623 and 624 of the pen pressure detection device 6 are automatically aligned and brought into contact with and electrically connected to the conductor patterns 81 and 82 formed on the board surface 8d of the printed circuit board 8. Hence, assembly and electric connection of the pen pressure detection device 6 and the printed circuit board 8 are facilitated.

Moreover, merely fitting the pen pressure detection device 6 to the board holder 7 to which the printed circuit board 8 is locked causes the end edge in the long side direction of the printed circuit board 8 (end edge in the direction of application of a pressure) to abut against the abutting surface 6223 between the projecting portion 6221 and the protruding portion 6222 of the connecting portion 622 of the holder 62 of the pen pressure detection device 6, as described above. The pen pressure detection device 6 and the board holder 7 therefore integrally receive an applied pen pressure. Therefore, electric connection parts between the pen pressure detection device 6 and the printed circuit board 8 are not affected by the application of the pen pressure, and strength of connection of the pen pressure detection device 6 to the printed circuit board 8 can be maintained even when a high pen pressure is applied.

Modifications of Foregoing Embodiment

Incidentally, in the above-described example, an end portion of the printed circuit board 8 is sandwiched between the projecting portion 6221 and the protruding portion 6222 of the connecting portion 622, and the end surface between the projecting portion 6221 and the protruding portion 6222 is used as the abutting surface 6223. However, in short, it suffices for the connecting portion 622 of the pen pressure detection device 6 and the printed circuit board 8 to be configured to engage with each other such that the two terminal members 623 and 624 formed on the projecting portion 6221 of the connecting portion 622 are electrically connected to the conductor patterns 81 and 82 of the printed circuit board 8. Therefore, the abutting surface against which the end edge in the longitudinal direction of the printed circuit board 8 abuts does not need to be formed in the pen pressure detection device 6. For example, the pen pressure detection device 6 may be configured to be locked to the board holder 7 so as to achieve an engaged state in which the two terminal members 623 and 624 formed on the projecting portion 6221 of the connecting portion 622 are electrically connected to the conductor patterns 81 and 82 of the printed circuit board 8.

In addition, the two terminal members 623 and 624 are formed on both sides of the projecting portion 6221. However, it suffices to configure the two terminal members 623 and 624 to be formed in an exposed state on the flat surface 6221a side and connected to the conductor patterns 81 and 82 on the printed circuit board 8. Thus, the two terminal members 623 and 624 may be formed at positions separated from each other on the flat surface 6221a rather than on both sides of the projecting portion 6221.

In the electronic pen 1 according to the above-described embodiment, a capacitance change corresponding to the pen pressure detected by the pressure sensor 61 of the pen pressure detection device 6 is transmitted as a change in frequency of the resonance circuit to the position detection device. However, a method of transmission of pen pressure information from the electronic pen to the position detection device is not limited to the present example.

Figure 9:
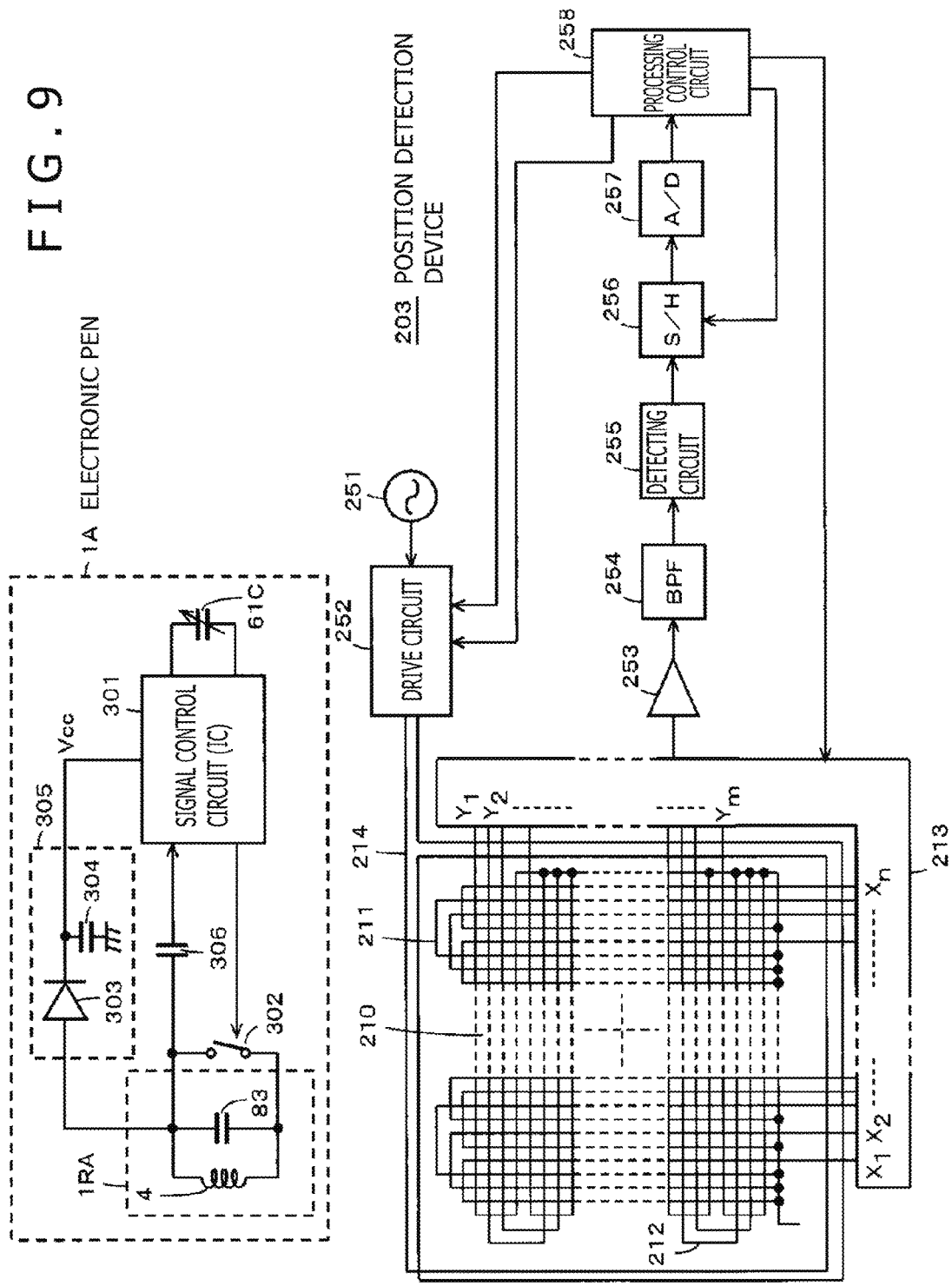
FIG. 9 is a diagram depicting an example of a circuit configuration of a position detection device used in conjunction with an electronic pen according to an embodiment of the present disclosure.

An example of FIG. 9 detects a position indicated by an electronic pen by detecting a position on a sensor receiving a signal from the resonance circuit of a coil 4 and a capacitor 83 as in the foregoing embodiment. However, the example of FIG. 9 transmits a pen pressure applied to the core body of the electronic pen as a digital signal from the electronic pen to a position detection device.

As with the position detection device 202 depicted in FIG. 8, a position detection device 203 in the example of FIG. 9 has a position detecting coil 210 formed by stacking an X-axis direction loop coil group 211 and a Y-axis direction loop coil group 212, and is also similarly provided with a selection circuit 213 that sequentially selects one loop coil of the two loop coil groups 211 and 212. In addition, the position detection device 203 in the example of FIG. 9 is provided with an excitation coil 214 for supplying power to an electronic pen 1A in the present example, the excitation coil 214 being provided around the two loop coil groups 211 and 212.

The electronic pen 1A in the example of FIG. 9 includes a signal control circuit 301 formed by an integrated circuit (IC). The coil 4 as an inductance element and the capacitor 83 disposed on a printed circuit board 8 form a resonance circuit 1RA. A switch 302 is connected in parallel with the resonance circuit 1RA. The switch 302 is configured to be subjected to on-off control by the signal control circuit 301. A signal from the resonance circuit is subjected to amplitude shift keying (ASK) modulation by the on-off control of the switch 302 by the signal control circuit 301, and supplied to the position detection device 203.

The signal control circuit 301 is configured to operate on power Vcc obtained by rectifying, in a rectifier circuit (power supply circuit) 305 constituted of a diode 303 and a capacitor 304, an alternating-current signal received in the resonance circuit 1RA constituted of the coil 4 and the capacitor 83 from the position detection device 203 by electromagnetic induction. The signal control circuit 301 is connected to the resonance circuit 1RA via a capacitor 306, and monitors the operating conditions of the resonance circuit 1RA. By monitoring the operating conditions of the resonance circuit 1RA, the signal control circuit 301 can detect conditions of electromagnetic coupling to the excitation coil 214 of the position detection device 203, or detect a signal such as control data transmitted from the position detection device 203 by using the two loop coil groups 211 and 212 so that desired operation control can be performed, though not described in the present example.

Further, the signal control circuit 301 is connected with a variable capacitance capacitor 61C formed by a pressure sensor 61 of a pen pressure detection device 6. The signal control circuit 301 is configured to be able to detect the capacitance of the variable capacitance capacitor 61C which capacitance corresponds to a pen pressure. The signal control circuit 301 detects the pen pressure in the electronic pen 1A from the value of the capacitance of the variable capacitance capacitor 61C, and converts the detected pen pressure into a digital signal of a plurality of bits, for example eight bits. The signal control circuit 301 then controls the switch 302 on the basis of the digital signal corresponding to the pen pressure. Incidentally, all of parts other than the coil 4 and the variable capacitance capacitor formed by the pressure sensor 61 are arranged on the printed circuit board 8.

Incidentally, the example of FIG. 9 will be described supposing that the loop coil groups 211 and 212 of the position detection device 203 are used only for reception of an electromagnetic coupling signal from the resonance circuit 1RA of the electronic pen 1A. However, this does not exclude using the loop coil groups 211 and 212 in place of the excitation coil 214 to generate a voltage for driving the signal control circuit 301 included in the electronic pen 1A by electromagnetic coupling between the loop coil groups 211 and 212 and the electronic pen 1A. In addition, this does not exclude transmitting a signal such as predetermined control data from the position detection device 203 to the signal control circuit 301 included in the electronic pen 1A.

In the position detection device 203 in the example of FIG. 9, the excitation coil 214 is connected to a drive circuit 252. The drive circuit 252 is connected to an oscillation circuit 251 that oscillates at a predetermined frequency fo.

The drive circuit 252 is controlled by a processing control circuit 258 formed by a microcomputer. The processing control circuit 258 controls the drive circuit 252 to control the supply of an oscillation signal of the frequency fo from the oscillation circuit 251 to the excitation coil 214. The processing control circuit 258 thus controls the transmission of the signal from the excitation coil 214 to the electronic pen 1A.

The selection circuit 213 is subjected to selection control by the processing control circuit 258 as in the position detection device 202 described above to select one loop coil. An induced voltage generated in the loop coil selected by the selection circuit 213 is amplified by a reception amplifier 253, and then supplied to a band-pass filter 254, so that only a component of the frequency fo is extracted. The band-pass filter 254 supplies the extracted component to a detection circuit 255.

The detection circuit 255 detects the component of the frequency fo, and supplies a direct-current signal corresponding to the detected component of the frequency fo to a sample and hold circuit 256. The direct-current signal is further sent to an A/D converter circuit 257. The A/D converter circuit 257 converts the analog output of the sample and hold circuit 256 into a digital signal, and outputs the digital signal to the processing control circuit 258.

Then, the processing control circuit 258 determines whether or not the digital signal from the A/D converter circuit 257 is a value exceeding a predetermined threshold value, and thereby determines whether or not the loop coil selected by the selection circuit 213 is a loop coil at a position indicated by the electronic pen 1A.

The processing control circuit 258 also detects a pen pressure by detecting interruption of the signal from the electronic pen 1A as a digital signal of a few bits, for example eight bits, separately from the detection of the position indicated by the electronic pen 1A.

Other Embodiments of Electronic Pen

In the above case, the present disclosure is applied to an electromagnetic induction type electronic pen. However, the present disclosure is applicable also to an active capacitive pen as an example of a capacitive type electronic pen. In an electronic pen as an example of the active capacitive pen to be described in the following, a coil wound around a ferrite core is a part of a charging circuit that charges a power supply of a signal transmitting circuit included in the active capacitive pen.

Figure 10:
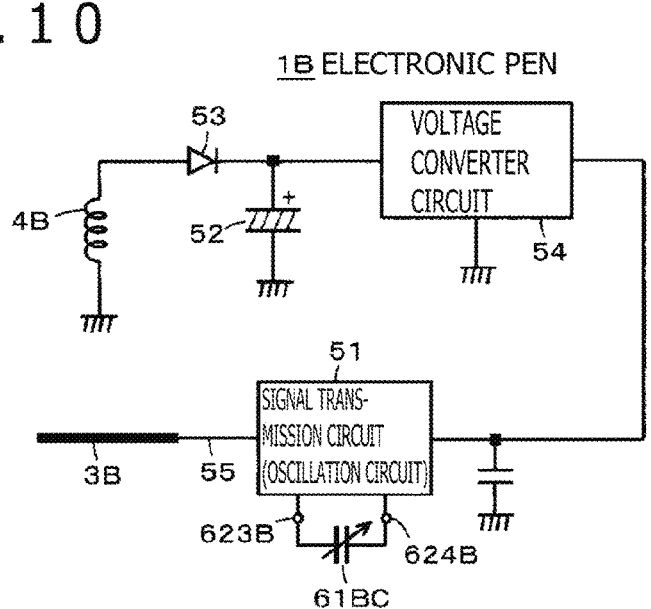
FIG. 10 is a diagram of assistance in explaining an example an electronic pen according to an embodiment of the present disclosure.

FIG. 10 depicts an example of a circuit configuration of an electronic pen 1B having a configuration of the active capacitive pen in the present example. In the electronic pen 1B having the configuration of the active capacitive pen, a core body 3B has the constitution of an electrode core formed of a conductor, for example a conductive metal or a hard resin mixed with a conductive powder. In the following description, the core body 3B will be referred to as an electrode core 3B. Incidentally, though not depicted, a pen pressure detection device of the electronic pen 1B is formed similar to that of the foregoing embodiment, and includes a pressure sensor 61B. The pen pressure detection device of the electronic pen 1B is fitted with a ferrite core wound with a coil 4B, and is fitted to a board holder and electrically connected to an electronic circuit (see FIG. 10) formed on a printed circuit board locked to the board holder.

In the present example, as depicted in FIG. 10, the electronic circuit formed on the printed circuit board has a circuit configuration including a signal transmission circuit 51, an electric double layer capacitor 52 as an example of a storage element that generates a driving voltage (power supply voltage) for driving the signal transmission circuit 51, a rectifying diode 53, and a voltage converter circuit 54. The signal transmission circuit 51 in the present example is formed by an oscillation circuit.

As in the foregoing embodiment, the electrode core 3B is inserted through a through hole of the ferrite core, and is fitted into a pressing member (pressure transmitting member) of the pen pressure detection device. The electrode core 3B transmits a pen pressure to the pressure sensor 61B via the pressing member. The electrode core 3B is electrically connected to the signal transmission circuit 51 on the printed circuit board by a connecting line 55. In this case, rather than being directly fitted to the pressing member of the pen pressure detection device, the electrode core 3B is fitted to the pressing member via a conductive elastic member such as a conductive rubber, and the conductive elastic member is electrically connected to the signal transmission circuit 51 via the connection line 55. Thus, when the electrode core 3B is fitted to the pressing member via the conductive elastic member, the electrode core 3B can be connected to the signal transmission circuit 51.

As depicted in FIG. 10, two terminal members 623B and 624B of the pen pressure detection device are electrically connected to the signal transmission circuit 51 formed on the printed circuit board. The oscillation circuit constituting the signal transmission circuit 51 generates a signal that changes in frequency according to the capacitance of a variable capacitance capacitor 61BC of the pressure sensor 61B of the pen pressure detection device, and supplies the generated signal to the electrode core 3B.

When the electronic pen 1B in the present example is mounted on a charger not depicted in the figures, an induced electromotive force is generated in the coil 4B due to an alternating magnetic field generated by the charger, and charges the electric double layer capacitor 52 via the diode 53. The voltage converter circuit 54 converts a voltage stored in the electric double layer capacitor 52 to a fixed voltage, and supplies the fixed voltage as power to the signal transmission circuit 51.

When the electronic pen 1B as a capacitive type stylus pen in the present example performs normal operation (when the electronic pen 1B does not perform charging operation), the coil 4B is at a fixed potential (ground potential (GND) in the present example), and therefore acts as a shield electrode provided around the periphery of the electrode core 3B. Incidentally, the fixed potential of the coil 4B when the capacitive type stylus pen performs normal operation is not limited to the ground potential, but may be a positive side potential of the power supply, or may be a potential intermediate between the positive side potential of the power supply and the ground potential.

The signal transmission circuit (oscillating circuit) 51 generates a signal whose frequency changes according to the capacitance of the variable capacitance capacitor 61BC formed by the pressure sensor 61B of the pen pressure detection device, and supplies the generated signal to the electrode core 3B. The signal from the signal transmission circuit 51 is radiated from the electrode core 3B as an electric field based on the signal. The oscillation circuit constituting the signal transmission circuit 51 is formed by an LC oscillation circuit using resonance by a coil and a capacitor, for example. A position detection device that detects the coordinate position of the capacitive type stylus pen as an example of the electronic pen 1B according to the present embodiment can determine a pen pressure applied to the electrode core 3B from the frequency of the signal.

Figure 11:
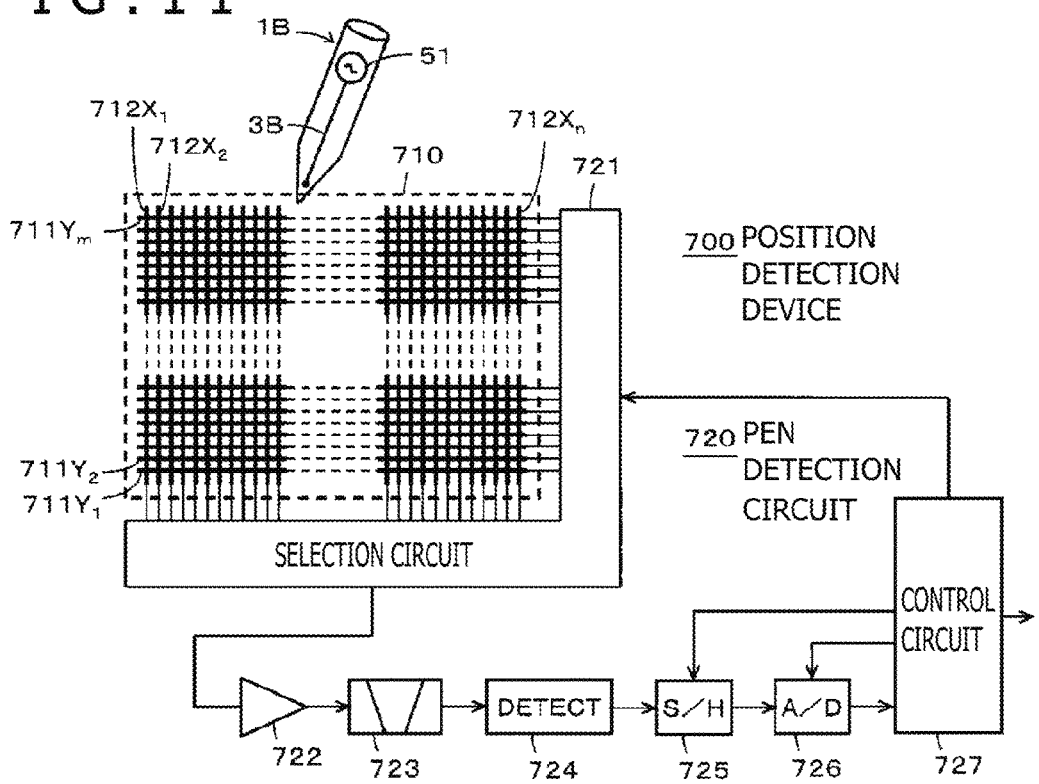
FIG. 11 is a diagram depicting an example of a circuit configuration of a position detection device used in conjunction with an electronic pen according to an embodiment of the present disclosure.
Figure 12:
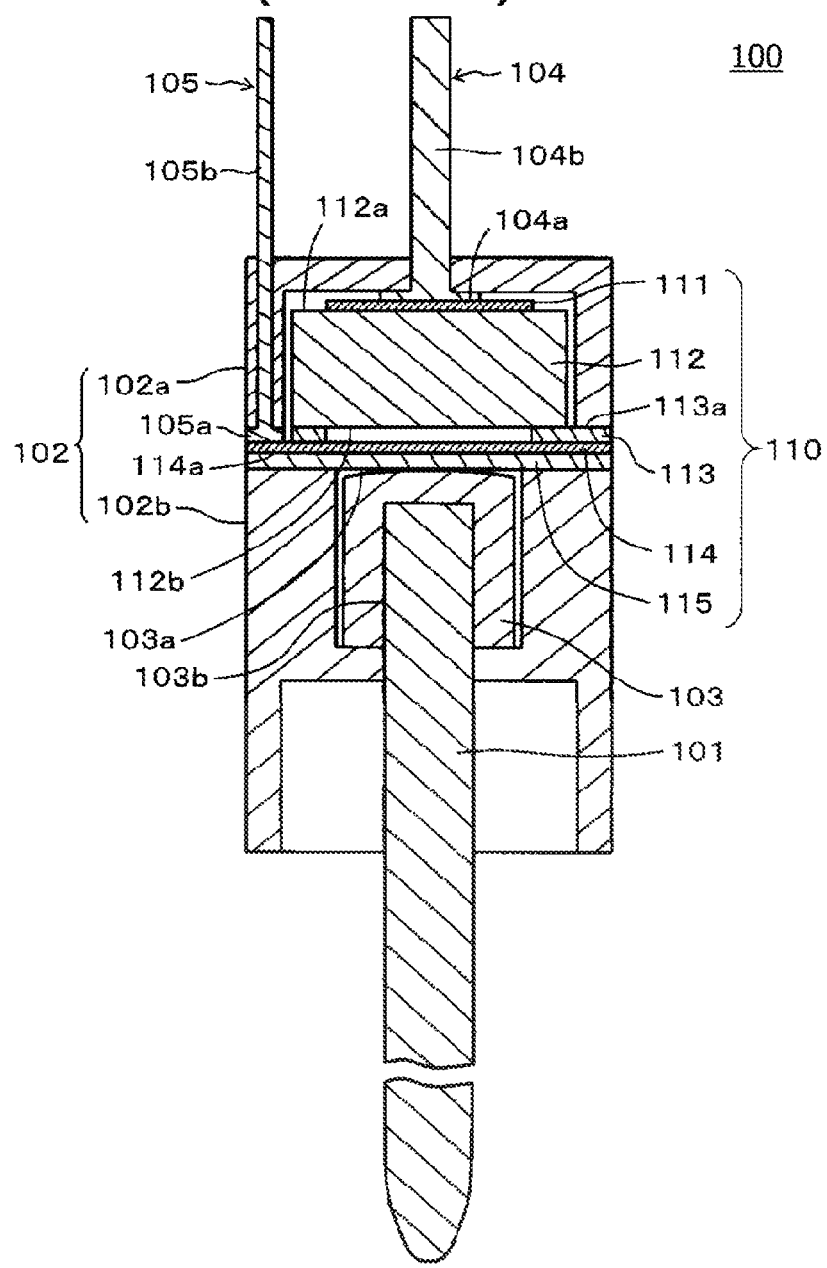
FIG. 12 is a diagram of assistance in explaining a conventional constitution example of a pen pressure detection device.
Figure 13A:
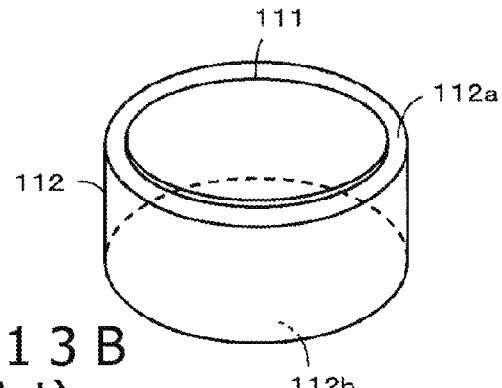
FIGS. 13A-13F are diagrams of assistance in explaining some of parts of the conventional pen pressure detection device in FIG. 12.
Figure 13B:
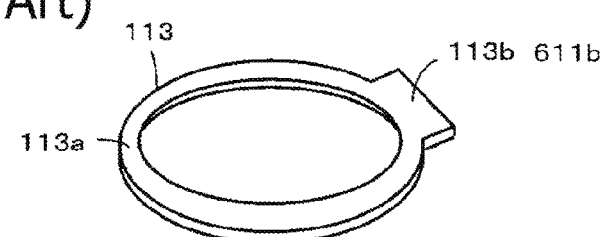
Figure 13C:
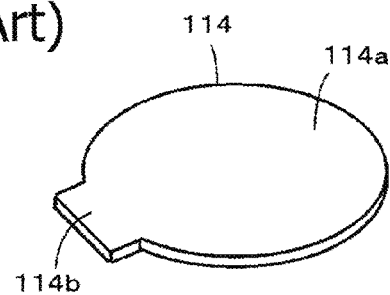
Figure 13D:
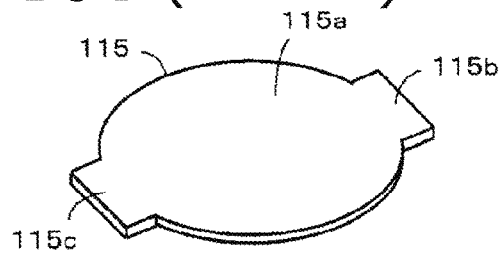
Figure 13E:
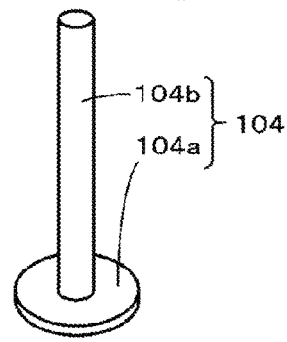
Figure 13F:
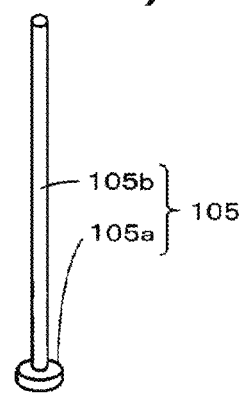

FIG. 11 is a block diagram of assistance in explaining a position detection device 700 that receives the signal from the electronic pen 1B having the configuration of the capacitive type stylus pen, and detects a position on a sensor and detects a pen pressure.

As depicted in FIG. 11, the position detection device 700 according to the present embodiment is constituted of a sensor 710 and a pen detecting circuit 720 connected to the sensor 710. Though a sectional view of the sensor 710 is omitted in the present example, the sensor 710 is formed by stacking a first conductor group 711, an insulating layer (not depicted), and a second conductor group 712 in order from a bottom layer side. The first conductor group 711 is for example a plurality of first conductors $711Y_1, 711Y_2, \ldots, 711Y_m$ (m is an integer of one or more) that extend in a horizontal direction (X-axis direction) and which are arranged in parallel with each other in a Y-axis direction so as to be separated from each other at predetermined intervals.

The second conductor group 712 is a plurality of second conductors $712X_1, 712X_2, \ldots, 712X_n$ (n is an integer of one or more) that extend in a direction intersecting the extending direction of the first conductors $711Y_1, 711Y_2, \ldots, 711Y_m$, or in a vertical direction (Y-axis direction) orthogonal to the extending direction of the first conductors $711Y_1, 711Y_2, \ldots, 711Y_m$ in the present example, and which are arranged in parallel with each other in the X-axis direction so as to be separated from each other at predetermined intervals.

Thus, the sensor 710 of the position detection device 700 has a configuration that detects a position indicated by the electronic pen 1B by using a sensor pattern formed by making the first conductor group 711 and the second conductor group 712 intersect each other.

Incidentally, in the following description, when each conductor of the first conductors $711Y_1, 711Y_2, \ldots, 711Y_m$ does not need to be distinguished from the other conductors, the conductor will be referred to as a first conductor 711Y. Similarly, when each conductor of the second conductors $712X_1, 712X_2, \ldots, 712X_n$ does not need to be distinguished from the other conductors, the conductor will be referred to as a second conductor 712X.

The pen detecting circuit 720 includes a selection circuit 721 as an input-output interface with the sensor 710, an amplifier circuit 722, a band-pass filter 723, a detecting circuit 724, a sample and hold circuit 725, an A/D converter circuit 726, and a control circuit 727.

The selection circuit 721 selects one conductor 711Y or 712X from the first conductor group 711 and the second conductor group 712 on the basis of a control signal from the control circuit 727. The conductor selected by the selection circuit 721 is connected to the amplifier circuit 722. A signal from the electronic pen 1B is detected by the selected conductor, and is amplified by the amplifier circuit 722. The output of the amplifier circuit 722 is supplied to the band-pass filter 723, where only a frequency component of the signal transmitted from the electronic pen 1B is extracted.

The output signal of the band-pass filter 723 is detected by the detecting circuit 724. The output signal of the detecting circuit 724 is supplied to the sample and hold circuit 725 to be sampled and held in predetermined timing according to a sampling signal from the control circuit 727, and is thereafter converted into a digital value by the A/D converter circuit 726. The digital data from the A/D converter circuit 726 is read and processed by the control circuit 727.

The control circuit 727 operates so as to send out respective control signals to the sample and hold circuit 725, the A/D converter circuit 726, and the selection circuit 721 according to a program stored in an internal read only memory (ROM). From the digital data from the A/D converter circuit 726, the control circuit 727 calculates position coordinates on the sensor 710 which position coordinates are indicated by the electronic pen 1B, and detects a pen pressure detected by the pen pressure detection device of the electronic pen 1B.

As a flow of operation, the control circuit 727 supplies a selection signal to the selection circuit 721 to select each of the second conductors 712X, and reads data output from the A/D converter circuit 726 as a signal level.

When a signal having a level equal to or higher than a predetermined value is detected from any of the second conductors 712X, the control circuit 727 stores the numbers of a second conductor 712X from which a highest signal level is detected and a plurality of second conductors 712X adjacent to the second conductor 712X from which the highest signal level is detected. Similarly, the control circuit 727 controls the selection circuit 721, and stores the numbers of a first conductor 711Y from which a highest signal level is detected among the first conductors 711Y and a plurality of first conductors 711Y adjacent to the first conductor 711Y from which the highest signal level is detected.

Then, the control circuit 727 detects a position on the sensor 710 which position is indicated by the electronic pen 1B from the numbers of the second conductors 712X and the numbers of the first conductors 711Y which numbers are stored as described above.

In addition, the control circuit 727 detects the frequency of a signal from the A/D converter circuit 726, and detects a pen pressure value detected by the pen pressure detection device of the electronic pen 1B from the detected frequency. Specifically, as described earlier, the oscillation frequency of the oscillation circuit constituting the signal transmission circuit 51 of the electronic pen 1B is a frequency corresponding to the capacitance of the variable capacitance capacitor 61BC formed by the pressure sensor 61B of the pen pressure detection device. The control circuit 727 for example has the information of a correspondence table of oscillation frequencies of the oscillation circuit constituting the signal transmission circuit 51 of the electronic pen 1B and pen pressure values, and detects a pen pressure value from the information of the correspondence table.

Incidentally, in the above-described example, the electronic pen 1B converts the pen pressure detected by the pressure sensor 61B of the pen pressure detection device into a frequency, and supplies the frequency to the electrode core 3B. However, a signal attribute to which the pen pressure is made to correspond is not limited to the frequency, but the pen pressure may be made to correspond to the phase of the signal, the number of times of interruption of the signal, or the like.

In addition, while the coil 4B wound around the ferrite core is used as a coil for charging in the electronic pen 1B having the configuration of the active capacitive pen in the above-described example, a cell (battery) may be included as a source of supply of the power supply voltage for the signal transmission circuit 51. In that case, the ferrite core wound with the coil is not necessary.

In addition, in the electronic pen 1B having the configuration of the active capacitive pen in the above-described example, the signal transmission circuit 51 is configured as only the oscillation circuit, and a pen pressure is transmitted as a change in the oscillation frequency of the oscillation circuit to the position detection device. However, the signal transmission circuit may be formed by an oscillation circuit and a circuit that applies a predetermined modulation to the oscillation signal of the oscillation circuit, and pen pressure information may be transmitted as for example an ASK signal or the like to the position detection device.

Other Embodiments or Modifications

In the foregoing embodiment, the variable capacitance capacitor formed by the pressure sensor of the pen pressure detection device is not limited to variable capacitance capacitors having a mechanical constitution formed by combining a plurality of parts as in the above-described example, but can have a one-part constitution using a semiconductor element whose capacitance is variable according to a pen pressure, as disclosed in Japanese Patent Laid-Open No. 2013-161307, for example.

In addition, the pressure sensor of the pen pressure detection device in the foregoing embodiment uses the variable capacitance capacitor whose capacitance is variable according to a pen pressure. However, it is needless to say that the pressure sensor of the pen pressure detection device may have a variable inductance value as a changing element that changes the resonance frequency of the resonance circuit or a variable resistance value.

DESCRIPTION OF REFERENCE SYMBOLS

1 . . . Electronic pen, 2 . . . Case, 3 . . . Core body, 4 . . . Coil, 5 . . . Ferrite core, 6 . . . Pen pressure detection device, 7 . . . Board holder, 8 . . . Printed board, 61 . . . Pressure sensor, 62 . . . Holder, 63 . . . Engaging member, 621 . . . Retaining portion, 622 . . . Connecting portion, 623, 624 . . . Terminal member, 81, 82 . . . Conductor pattern

The invention claimed is:

1. A pen pressure detection device comprising:
a pressure sensor including electrodes which, in operation, output electrical information corresponding to an applied pressure; and
a holder configured to retain the pressure sensor and electrically connect the electrodes of the pressure sensor to a circuit board having a circuit which, in operation, detects the applied pressure based on the electrical information output from the pressure sensor;
the holder including a first portion that retains the pressure sensor and a second portion that engages with the circuit board, the holder having a surface on which wiring is formed, the wiring extending from the first portion to the second portion, and the electrodes of the pressure sensor being electrically connected to the circuit board via the wiring when the holder and the circuit board are engaged with each other.

2. The pen pressure detection device according to claim 1, wherein the holder is formed from resin and the wiring includes three-dimensional patterns formed on the resin.

3. The pen pressure detection device according to claim 1, wherein the wiring on the surface of the holder is plated with a conductive material.

4. The pen pressure detection device according to claim 1, wherein the pressure sensor includes a dielectric, a conductor, and a spacer that is formed of an insulating material and is interposed between the dielectric and the conductor.

5. The pen pressure detection device according to claim 1, wherein the pressure sensor includes a semiconductor element that changes capacitance according to the applied pressure.

6. The pen pressure detection device according to claim 1, wherein the electrodes of the pressure sensor are electrically connected to the wiring or the first ends of the terminals when the pressure sensor is retained in the first portion.

7. The pen pressure detection device according to claim 1, further comprising:
an engagement member that slidably retains a pressure transmission member in the direction of application of the pressure, and includes a portion that engages with the first portion of the holder,
wherein when the engagement member is engaged with the first portion of the holder, the pressure sensor is retained in the first portion and the pressure is transmittable to the pressure sensor via the transmission member.

8. A pen pressure detection device comprising:
a pressure sensor including electrodes which, in operation, output electrical information corresponding to an applied pressure; and
a holder including a first portion that retains the pressure sensor and a second portion having terminals formed of a conductive material that electrically connects the electrodes of the pressure sensor retained in the first portion to a circuit board having a circuit which, in operation, detects the applied pressure based on the electrical information output from the pressure sensor;
the first portion and the second portion of the holder being arranged along a direction in which the pressure is applied with the first portion on a side of the holder to which the pressure is applied;
the second portion of the holder including a third portion that engages with the circuit board, the third portion being disposed on a side of the holder opposite the side of the holder to which the pressure is applied, and the terminals extending from the second portion to the third portion;
the pressure sensor and the circuit board being electrically connected to each other via the terminals when the third portion is engaged with the circuit board.

9. The pen pressure detection device according to claim 8, wherein:
the third portion has a projection that projects in a same direction as the direction in which the pressure is applied, on the side of the holder opposite the side of the holder to which the pressure is applied,
a main body of the projection is formed of resin, and has a first surface parallel with a board surface of the circuit board,
a first end of each of the terminals is electrically connected to one of the electrodes of the pressure sensor retained in the first portion,
a second end of each of the terminals is exposed on the first surface of the main body of the projection, and
when the holder and the circuit board are engaged with each other, the first surface of the projection comes into contact with the board surface of the circuit board, and the second ends of the terminals are electrically connected to conductor patterns formed on the circuit board.

10. The pen pressure detection device according to claim 9, wherein the second ends of the terminals on the projections are formed on respective side surfaces of the projection, the side surfaces of the projection being orthogonal to the direction of application of the pressure.

11. The pen pressure detection device according to claim 9, wherein a protrusion is formed on the third portion, the circuit board being sandwiched between the protrusion and the first surface of the projection when the holder and the circuit board are engaged with each other.

12. The pen pressure detection device according to claim 9, wherein:
the main body of the projection has a second surface against which an end edge of the circuit board abuts when the holder and the circuit board are engaged with each other, and
when the third portion and the circuit board engage with each other and the end edge of the circuit board abuts against the second surface of the projection, the first surface of the projection of the connecting portion of the holder comes into contact with the board surface of the circuit board, and the second of the terminals are electrically connected to the conductor patterns formed on the circuit board.

13. The pen pressure detection device according to claim 12, wherein a protrusion is formed on the second portion, the circuit board being sandwiched between the protrusion and the first surface of the projection when the holder and the circuit board are engaged with each other, and the second surface is formed between the projection and the protrusion.

14. The pen pressure detection device according to claim 8, wherein the holder is formed from resin and the terminals are formed as three-dimensional patterns on the resin.

15. The pen pressure detection device according to claim 14, wherein the terminals are plated with a conductive material.

16. An electronic pen comprising:
a core body;
a pen pressure detection device which, in operation, detects a pressure applied to a tip of the core body as a pen pressure;
a circuit board on which a circuit which, in operation, generates a signal corresponding to the pen pressure detected by the pen pressure detection device is disposed; and
a first holder that retains the pen pressure detection device and the circuit board;
the core body, the pen pressure detection device, and the circuit board being sequentially arranged in an axial direction within a hollow portion of a tubular casing;
the pen pressure detection device including:
a pressure sensor including electrodes which, in operation, outputs electrical information corresponding to the applied pressure, and
a second holder that retains the pressure sensor, and electrically connects the retained pressure sensor to the circuit board having a circuit which, in operation, detects the applied pressure based on the electrical information output from the pressure sensor, the second holder including a first portion that retains the pressure sensor and a second portion that engages with the circuit board, the second holder having a surface on which wiring is formed, the wiring extending from the first portion to the second portion, and the electrodes of the pressure sensor being electrically connected to the circuit board via the wiring when the second holder and the circuit board are engaged with each other.

17. An electronic pen comprising:
a core body;
a pen pressure detection device which, in operation, detects a pressure applied to a tip of the core body as a pen pressure;
a circuit board on which a circuit which, in operation, generates a signal corresponding to the pen pressure detected by the pen pressure detection device is disposed; and
a first holder that retains the pen pressure detection device and the circuit board;
the core body, the pen pressure detection device, and the circuit board being sequentially arranged in an axial direction within a hollow portion of a tubular casing;
the pen pressure detection device including:
a pressure sensor including electrodes which, in operation, outputs electrical information corresponding to the applied pressure, and
a second holder including a first portion that retains the pressure sensor and a second portion having terminals formed of a conductive material that electrically connects the electrodes of the pressure sensor retained in the first portion to the circuit board having a circuit which, in operation, detects the applied pressure based on the electrical information output from the pressure sensor,
the first portion and the second portion of the second holder being arranged along a direction of application of the pressure with the first portion on a side of the second holder to which the pressure is applied,
the second portion of the second holder including a third portion that engages with the circuit board on a side of the second holder opposite the side of the second holder to which the pressure is applied, and the terminals from the first portion to the third portion, and
the pressure sensor and the circuit board being electrically connected to each other via the terminals when the third portion of the second holder engages with the circuit board.

18. The electronic pen according to claim 17, wherein the second holder is formed from resin and the terminals are formed as three-dimensional patterns on the resin.

19. The electronic pen according to claim 17, wherein:
the first holder includes a mounting base on which the circuit board is mounted, and includes a first portion fitted with the second portion of the second holder of the pen pressure detection device, and
when the second portion of the second holder of the pen pressure detection device is fitted into the first portion of the first holder, the terminals formed on the second portion of the pen pressure detection device are electrically connected to conductors formed on the circuit board mounted on the mounting base.

20. The electronic pen according to claim 19, wherein:
ends of each of the terminals on the second portion of the second holder are formed on second surfaces disposed on opposite sides of a first surface of the second portion, the first surface of the connecting portion being parallel with a board surface of the circuit board, the second surfaces of the second portion being orthogonal to the direction of application of the pressure,
conductor patterns extending along the direction of application of the pressure are formed on the board surface of the circuit board, the conductor patterns respectively corresponding to the terminals, and
when the second portion of the second holder of the pen pressure detection device is inserted into the first portion of the first holder, the terminals are electrically connected to the conductor patterns.

21. The electronic pen according to claim 20, wherein a protrusion is formed on the second portion of the pen pressure detection device, the circuit board being sandwiched between the protrusion and the first surface of the second portion when the second portion is inserted into the first portion of the first holder.

22. The pen pressure detection device according to claim 20, wherein a protrusion is formed on the second portion, the circuit board being sandwiched between the protrusion and the first surface parallel with the board surface of the circuit board, and a second surface is formed between the first surface parallel with the board surface of the circuit board and the protrusion.

23. The electronic pen according to claim 17, wherein the pressure sensor of the pen pressure detection device includes a dielectric, a conductor, and a spacer that is interposed between the dielectric and the conductor.

24. The electronic pen according to claim 17, wherein the pressure sensor of the pen pressure detection device includes a semiconductor element that changes capacitance according to the applied pressure.

25. The electronic pen according to claim 17, wherein the electrodes of the pressure sensor of the pen pressure detection device are electrically connected to the wiring or the terminals when the pressure sensor is retained in the first portion.

26. The pen pressure detection device according to claim 17, wherein:
the third portion of the second holder has a projection that projects in the direction of application of the pressure on the side of the second holder opposite the side of the second holder to which the pressure is applied,
a main body of the projection has a first surface against which an end edge of the wiring board abuts, and
when the second portion and the circuit board are engaged with each other and the end edge of the wiring board abuts against the first surface of the projection, a second surface of the projection of the second portion of the holder, the second surface being parallel with a board surface of the circuit board, comes into contact with the board surface of the circuit board, and respective ends of the terminals are electrically connected to conductor patterns formed on the circuit board.

27. The electronic pen according to claim 17, further comprising:
a pressure transmission member which is coupled to the core body, and which, in operation, transmits the pressure applied to the core body to the pressure sensor; and
a fitting member that is fitted to the first portion of the second holder, and enables the pressure transmission member to transmit the pressure to the pressure sensor;
wherein when the fitting member is fitted to the first portion of the holder, the pressure sensor is retained in the first portion in a state in which the pressure transmission member is coupled to the pressure sensor.

28. The electronic pen according to claim 17, wherein in the tubular casing, a coil wound around a magnetic core is disposed on a core body side of the pen pressure detection device, and the core body is inserted through a through hole formed in the magnetic core to transmit the pressure applied to the core body to the pen pressure detection device.

29. The electronic pen according to claim 17, wherein a capacitor electrically connected to the coil constituting a resonance circuit is formed on the circuit board.

30. The electronic pen according to claim 17, wherein the core body is formed by a member having conductivity.

\* \* \* \* \*